(12) United States Patent
Pedlar et al.

(10) Patent No.: US 8,438,685 B2
(45) Date of Patent: *May 14, 2013

(54) FLOOR TREATMENT APPARATUS

(75) Inventors: Roger Pedlar, Lakewood, CO (US);
Brian J. Doll, Denver, CO (US); Rusty Simmon, Denver, CO (US); Nevin Green, Littleton, CO (US); Daniel Pearson, Littleton, CO (US); Loi X. Tran, Highlands Ranch, CO (US); Robert S. Gorsky, Highlands Ranch, CO (US); Eric L. Shark, Littleton, CO (US); Daniel C. Venard, Centennial, CO (US)

(73) Assignee: Karcher North America, Inc., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/554,593

(22) Filed: Jul. 20, 2012

(65) Prior Publication Data

US 2012/0291218 A1 Nov. 22, 2012

Related U.S. Application Data

(60) Division of application No. 11/868,353, filed on Oct. 5, 2007, now Pat. No. 8,245,345, which is a continuation of application No. 11/059,663, filed on Feb. 15, 2005, now Pat. No. 7,533,435, which is a continuation-in-part of application No. 10/737,027, filed on Dec. 15, 2003, now abandoned, which is a continuation-in-part of application No. 10/438,485, filed on May 14, 2003, now abandoned.

(60) Provisional application No. 60/545,153, filed on Feb. 16, 2004, provisional application No. 60/627,606, filed on Nov. 12, 2004.

(51) Int. Cl.
*A47L 11/03* (2006.01)
*A47L 11/16* (2006.01)

(52) U.S. Cl.
USPC ........... 15/49.1; 15/50.1; 15/340.1; 15/340.3; 15/320; 15/401

(58) Field of Classification Search ................... 15/49.1, 15/50.1, 78, 98, 320, 321, 340.1, 340.3, 401; 180/6.2, 180/211; D12/85
See application file for complete search history.

(56) References Cited

U.S. PATENT DOCUMENTS 1,596,041 A 8/1926 Young
1,639,959 A 8/1927 Owen (Continued)

FOREIGN PATENT DOCUMENTS

BR PI 0511488 1/2008
CA 2242793 7/1998

(Continued)

OTHER PUBLICATIONS

Galopio Operating Instructions, Schmidt Winterdienst-Und Kommunaltechnik, Jan. 17, 2005, Issue 5, pp. 1-84.

(Continued)

*Primary Examiner* — Randall Chin
(74) *Attorney, Agent, or Firm* — Sheridan Ross P.C.

(57) ABSTRACT

The present invention relates generally to an apparatus for cleaning or otherwise treating a floored surface that includes a platform adapted to support the weight of an operator. In addition, one embodiment of the present invention is capable of generally performing 360° turns to facilitate the treatment of difficult to access portions of the floored surface.

10 Claims, 31 Drawing Sheets

U.S. PATENT DOCUMENTS

| | | | |
|---|---|---|---|
| 1,888,339 A | 11/1932 | White |
| 1,900,889 A | 3/1933 | Becker |
| 1,995,084 A | 3/1935 | Wichle |
| 1,999,696 A | 4/1935 | Kitto |
| 2,192,397 A | 3/1940 | Carlson |
| 2,263,762 A | 11/1941 | Dow et al. |
| 2,668,979 A | 2/1954 | MacFarland |
| 3,005,224 A | 10/1961 | Magarian |
| 3,065,490 A | 11/1962 | Arones |
| 3,093,853 A | 6/1963 | Tamny |
| 3,193,862 A | 7/1965 | Lyon |
| 3,206,787 A | 9/1965 | Daniels et al. |
| 3,233,274 A | 2/1966 | Kroll |
| 3,284,830 A | 11/1966 | Kroll |
| 3,436,788 A | 4/1969 | Tamny |
| 3,461,479 A | 8/1969 | Tierney |
| 3,504,858 A | 4/1970 | Liddiard |
| 3,506,080 A | 4/1970 | Hott |
| RE26,950 E | 9/1970 | Hays |
| 3,604,051 A | 9/1971 | Wendall et al. |
| 3,631,558 A | 1/1972 | Kovacevic |
| 3,705,437 A | 12/1972 | Rukauina, Jr. et al. |
| 3,705,746 A | 12/1972 | McLeod |
| 3,833,961 A | 9/1974 | Fortman et al. |
| 3,846,865 A | 11/1974 | Holman |
| 3,879,789 A | 4/1975 | Kasper |
| 3,883,301 A | 5/1975 | Emrick et al. |
| 3,892,003 A | 7/1975 | Peabody |
| 4,010,507 A | 3/1977 | Johnson |
| 4,019,218 A | 4/1977 | Cyphert |
| 4,037,289 A | 7/1977 | Dojan |
| 4,046,321 A | 9/1977 | Hewett |
| 4,135,669 A | 1/1979 | Bridges et al. |
| 4,196,492 A | 4/1980 | Johnson et al. |
| 4,200,952 A | 5/1980 | Smies et al. |
| 4,214,338 A | 7/1980 | Kyle et al. |
| 4,293,971 A | 10/1981 | Block |
| 4,339,841 A | 7/1982 | Walhauser et al. |
| 4,354,569 A | 10/1982 | Eichholz |
| D267,084 S | 11/1982 | Bittinger |
| 4,383,551 A | 5/1983 | Lynch et al. |
| D273,621 S | 4/1984 | Haub et al. |
| 4,499,624 A | 2/1985 | Bloom et al. |
| 4,538,695 A | 9/1985 | Bradt |
| 4,596,061 A | 6/1986 | Henning |
| 4,654,918 A | 4/1987 | Cooper |
| D290,053 S | 5/1987 | Block |
| D290,054 S | 5/1987 | Block |
| 4,675,935 A | 6/1987 | Kasper et al. |
| 4,716,980 A | 1/1988 | Butler |
| 4,759,094 A | 7/1988 | Palmer et al. |
| 4,805,258 A | 2/1989 | Sitarski et al. |
| 4,809,397 A | 3/1989 | Jacobs et al. |
| 4,847,944 A | 7/1989 | Lackner |
| 4,850,077 A | 7/1989 | Venturini |
| 4,874,055 A | 10/1989 | Beer |
| 4,879,784 A | 11/1989 | Shero |
| 4,920,997 A | 5/1990 | Vetter et al. |
| 5,044,043 A | 9/1991 | Field et al. |
| 5,054,150 A | 10/1991 | Best et al. |
| 5,075,921 A | 12/1991 | Gleadall |
| D323,797 S | 2/1992 | Oslapas et al. |
| 5,127,124 A | 7/1992 | Palmer et al. |
| 5,135,080 A | 8/1992 | Haston |
| 5,168,947 A | 12/1992 | Rodenborn |
| 5,174,730 A | 12/1992 | Ket et al. |
| 5,217,166 A | 6/1993 | Schulze et al. |
| 5,221,026 A | 6/1993 | Williams |
| 5,245,144 A | 9/1993 | Stammen |
| 5,416,949 A | 5/1995 | Jute |
| 5,435,038 A | 7/1995 | Sauers |
| 5,465,451 A | 11/1995 | Stegens |
| 5,502,868 A | 4/1996 | Braeendle |
| 5,509,162 A | 4/1996 | Burgoon |
| D370,320 S | 5/1996 | Hachtmann |
| 5,537,712 A | 7/1996 | Weber et al. |
| 5,555,595 A | 9/1996 | Ligman |
| 5,607,178 A | 3/1997 | Legatt et al. |
| 5,742,975 A | 4/1998 | Knowlton et al. |
| 5,785,453 A | 7/1998 | Marty et al. |
| 5,802,665 A | 9/1998 | Knowlton et al. |
| 5,898,970 A | 5/1999 | Straiton |
| 5,901,409 A | 5/1999 | Schick et al. |
| 5,984,031 A | 11/1999 | Velke et al. |
| 6,023,813 A | 2/2000 | Thatcher et al. |
| 6,030,465 A | 2/2000 | Marcussen et al. |
| 6,059,055 A | 5/2000 | Velke et al. |
| 6,088,873 A | 7/2000 | Pacchini et al. |
| 6,145,855 A | 11/2000 | Bellis, Jr. et al. |
| 6,158,084 A | 12/2000 | Weber et al. |
| 6,158,673 A | 12/2000 | Toetschinger |
| 6,206,980 B1 | 3/2001 | Robinson |
| 6,230,363 B1 | 5/2001 | Kawai et al. |
| 6,266,892 B1 | 7/2001 | Haynie |
| 6,283,170 B1 | 9/2001 | Robinson |
| 6,302,230 B1 | 10/2001 | Kamen et al. |
| 6,367,120 B2 | 4/2002 | Beauchamp |
| 6,371,228 B1 | 4/2002 | Husted et al. |
| 6,397,429 B1 | 6/2002 | Legatt et al. |
| 6,425,958 B1 | 7/2002 | Giddings et al. |
| 6,431,217 B2 | 8/2002 | Robinson |
| 6,442,789 B1 | 9/2002 | Legatt et al. |
| 6,450,867 B1 | 9/2002 | Legatt |
| 6,453,506 B1 | 9/2002 | Sumner |
| 6,464,025 B1 | 10/2002 | Koeper et al. |
| 6,490,849 B1 | 12/2002 | Scag et al. |
| 6,497,422 B1 | 12/2002 | Bellis, Jr. et al. |
| 6,533,871 B2 | 3/2003 | Zahuranec et al. |
| 6,535,793 B2 | 3/2003 | Allard |
| 6,554,207 B2 | 4/2003 | Ebberts |
| 6,585,827 B2 | 7/2003 | Field et al. |
| 6,594,844 B2 | 7/2003 | Jones |
| 6,625,843 B2 | 9/2003 | Kim et al. |
| 6,629,333 B2 | 10/2003 | Bolden et al. |
| 6,647,585 B1 | 11/2003 | Robinson |
| 6,650,975 B2 | 11/2003 | Ruffner |
| 6,671,925 B2 | 1/2004 | Field et al. |
| 6,684,452 B2 | 2/2004 | Lehman et al. |
| 6,705,332 B2 | 3/2004 | Field et al. |
| 6,721,990 B2 | 4/2004 | Zahuranec et al. |
| 6,725,512 B2 | 4/2004 | Carter et al. |
| 6,735,811 B2 | 5/2004 | Field et al. |
| 6,735,812 B2 | 5/2004 | Hekman et al. |
| 6,760,947 B2 | 7/2004 | Stuchlik |
| 6,772,475 B2 | 8/2004 | Weber et al. |
| 6,789,290 B2 | 9/2004 | Kent et al. |
| 6,842,940 B2 | 1/2005 | Christopher et al. |
| 6,845,829 B2 | 1/2005 | Hafendorfer |
| 6,849,829 B1 | 2/2005 | Otterbach |
| 6,918,156 B2 | 7/2005 | Joo et al. |
| 6,918,603 B2 | 7/2005 | Boyd |
| 6,941,614 B2 | 9/2005 | Montgomery |
| 6,981,338 B2 | 1/2006 | Jensen et al. |
| 7,025,835 B2 | 4/2006 | Pedlar et al. |
| 7,048,805 B2 | 5/2006 | Kent et al. |
| 7,370,386 B2 | 5/2008 | Lehman et al. |
| 7,533,435 B2 | 5/2009 | Pedlar et al. |
| 8,245,345 B2 | 8/2012 | Pedlar et al. |
| 2003/0159225 A1 | 8/2003 | Kuo |
| 2003/0192963 A1 | 10/2003 | Ebberts |
| 2004/0040102 A1 | 3/2004 | Field et al. |
| 2004/0172769 A1 | 9/2004 | Giddings et al. |
| 2004/0187895 A1 | 9/2004 | Field et al. |
| 2004/0221407 A1 | 11/2004 | Field et al. |
| 2004/0226578 A1 | 11/2004 | Guest et al. |
| 2004/0226584 A1 | 11/2004 | Guest et al. |
| 2004/0262871 A1 | 12/2004 | Schreuder et al. |
| 2006/0064844 A1 | 3/2006 | Venard et al. |
| 2006/0124770 A1 | 6/2006 | Venard et al. |
| 2006/0156498 A1 | 7/2006 | Venard et al. |

FOREIGN PATENT DOCUMENTS

| | | |
|---|---|---|
| CA | 2268234 | 10/1999 |
| DE | 1270066 | 6/1968 |
| DE | 1658384 | 4/1971 |
| DE | 69011648 | 12/1994 |
| DE | 4440202 | 5/1995 |

| | | |
|---|---|---|
| DE | 9421472 | 1/1996 |
| DE | 4429996 | 2/1996 |
| DE | 9421625 | 3/1996 |
| DE | 19539350 | 4/1997 |
| DE | 19745887 | 4/2000 |
| DE | 19851666 | 9/2000 |
| DE | 69608989 | 11/2000 |
| DE | 19927593 | 4/2001 |
| DE | 10029691 | 4/2002 |
| DE | 10030725 | 4/2002 |
| DE | 10062329 | 7/2002 |
| DE | 19851681 | 7/2002 |
| DE | 20204485 | 10/2002 |
| DE | 10142192 | 3/2003 |
| DE | 10204118 | 10/2003 |
| DE | 10218244 | 11/2003 |
| DE | 10221349 | 11/2003 |
| DE | 10221351 | 11/2003 |
| DE | 10221352 | 11/2003 |
| DE | 10307150 | 9/2004 |
| DE | 10324825 | 12/2004 |
| DE | 10324826 | 12/2004 |
| EP | 0017913 | 4/1983 |
| EP | 0281976 | 9/1988 |
| EP | 0283022 | 9/1988 |
| EP | 0176696 | 4/1989 |
| EP | 0176697 | 5/1990 |
| EP | 0421194 | 6/1995 |
| EP | 0792615 | 9/1997 |
| EP | 0867331 | 9/1998 |
| EP | 1023867 | 6/1999 |
| EP | 0951857 | 10/1999 |
| EP | 1108092 | 6/2001 |
| EP | 1164074 | 12/2001 |
| EP | 1260129 | 11/2002 |
| EP | 1265713 | 12/2002 |
| EP | 01108091 | 10/2004 |
| EP | 1335869 | 10/2004 |
| EP | 1604605 | 12/2005 |
| GB | 2338686 | 12/1999 |
| JP | 09-094201 | 4/1997 |
| JP | 2000-217759 | 8/2000 |
| JP | 2003-504095 | 2/2003 |
| WO | WO 86/01240 | 2/1986 |
| WO | WO 86/02394 | 4/1986 |
| WO | WO 90/10416 | 9/1990 |
| WO | WO 92/13480 | 8/1992 |
| WO | WO 97/15730 | 5/1997 |
| WO | WO 00/74549 | 12/2000 |
| WO | WO 00/79058 | 12/2000 |
| WO | WO01/05216 | 1/2001 |
| WO | WO 2005/079468 | 9/2005 |

OTHER PUBLICATIONS

Photo and information related to Galopio device sold on Mascus website, available at http://www.mascus.com/product_card.asp?br=Broddway&catn=Groundscare&page=1&location=EN&pr . . . , indicates that device was registered in 2000, printed on Jan. 29, 2007, p. 1.
Photo of Galopio device, available at http://www.bassewitz.de/fahrzeuge/schmidt.htm, as early as Jan. 26, 2002, printed on Jan. 29, 2007, pp. 1-2.
"Scmidt Produkte: Kleinkehrfahrzeug Galopio", Photo of Galopio device, available at http://database.schmidtgroup.net/loader.php//en/schmidt/swk/products/00011/picture1.html, as early as Apr. 29, 2003, printed on Jan. 29, 2007, p. 1.
"Scmidt Produkte: Kleinkehrfahrzeug Galopio", Photo of Galopio device, available at http://database.schmidtgroup.net/loader.php/de/schmidt/swk/00011/, as early as May 29, 2003, printed on Jan. 29, 2007, p. 1.
Hefter Cleantech, Convert 82, May 19, 2006, 3 pages.
Kärcher, Multicleaner MC600 Manual, date unknown, 44 pages.
Kärcher, MC600 Multicleaner Brochure, date unknown, 4 pages.
Kärcher, NT301 Brochure, date unknown, 2 pages.
Kärcher, MC600 Multicleaner Brochure, date unknown, 2 pages.
Fantomat Sale Sheet, Buzili-Werk Wagner GmbH & Co.
No-Touch Cleaning Brochure, Kaivac, Inc., dated 2003, 8 pages.
Print out of Kaivac No-Touch Clean System, www.Kaivac.com, dated Jan. 23, 2003, 3 pages.
Print out of Nilfisk Aquatron 8 machine, www.mn.nilfisk-advance.com, dated Jan. 30, 2003, 1 page.
Nobles Typhoon 16lOP/1612 Wet/Dry Vacuum Operator and Parts Manual, Jan. 2000, 22 pages Kaivac, Inc.
Warning: Your Competitor has a KaiVac, Sep. 1998, 10 pages.
Kärcher, Multicleaner MC 600, Mar. 1990, 7 pages.
Kärcher, Worldwide Cleaning Expertise Programme 91/92, published more than one year prior to the filing date of U.S. Patent 6,425,958, filed Feb. 2001, 50 pages.
Service Master, Boss 2000B Manual, Oct. 1995, 42 pages.
Service Master, Boss 2000E Manual, Aug. 1997, 32 pages.
Service Master, Boss 2000LE Manual, Mar. 1998, 30 pages.
Galopio Cleaning Device, www.schmidt-holding.com, accessed Feb. 23, 2005, 4 pages.
Written Opinion of the International Searching Authority of related PCT Application PCT/US06/40095, May 24, 2007, 7 pages.
International Search Report of related PCT Application PCT/US06/40095, May 24, 2007, 3 pages.
First Office Action (including translation) for Chinese Application No. 200580011019.5, date mailed by foreign associate Nov. 21, 2008.
Second Office Action (including translation) for Chinese Application No. 200580011019.5, dated May 22, 2009.
Fourth Office Action (translation only) for Chinese Patent Application No. 200580011019.5, issued Oct. 13, 2010.
Notification of Grant Patent Right (including translation) for Chinese Patent Application No. 200580011019.5, dated Mar. 2, 2011.
Supplementary European Search Report for European Application No. 05713744, dated Apr. 8, 2008.
Official Action for European Application No. 05713744, dated Feb. 12, 2009.
Official Action for European Application No. 05713744, dated Nov. 3, 2010.
Extended European Search Report for European Patent Application No. 10178165.6, dated Oct. 29, 2010.
European Written Opinion and Search Report, Nov. 10, 2004 relating to European Application No. EP 04012451.
Written Opinion by the Australian Patent Office for Singapore Application No. SG 200605344-1, mailed Jan. 9, 2008.
Examination Report issued by the Australian Patent Office for Singapore Application No. SG 200605344-1, mailed Jan. 25, 2010.
Official Action for Japanese Patent Application No. 2006-553367, issued Apr. 6, 2011.
Official Action for Japanese Patent Application No. 2006-553367, issued Apr. 5, 2011.
Notice of Allowance for U.S. Appl. No. 11/059,663, mailed Feb. 6, 2009.
Office Action for U.S. Appl. No. 11/059,663, mailed Nov. 10, 2008.
Office Action for U.S. Appl, No. 11/059,663, mailed May 14, 2008.
Office Action for U.S. Appl. No. 11/059,663, mailed Apr. 19, 2007.
Office Action for U.S. Appl. No. 11/059,663, mailed Dec. 15, 2006.
Office Action for U.S. Appl. No. 11/059,663, mailed Jun. 26, 2006.
Office Action for U.S. Appl. No. 11/253,100, mailed Sep. 8, 2008.
Office Action for U.S. Appl. No. 11/253,100, mailed May 6, 2009.
Official Action for U.S. Appl. No. 11/253,100, mailed Aug. 14, 2009.
Official Action for U.S. Appl. No. 11/868,353, mailed Oct. 13, 2009 Restriction Requirement.
Official Action for U.S. Appl. No. 11/868,353, mailed Feb. 16, 2010 Restriction Requirement.
Official Action for U.S. Appl. No. 11/868,353, mailed Jun. 11, 2010.
Official Action for U.S. Appl. No. 11/868,353, mailed Jan. 27, 2011.
Official Action for U.S. Appl. No. 11/868,353, mailed May 9, 2011.
Official Action for U.S. Appl. No. 11/868,353, mailed Sep. 7, 2011 17 pages.
Official Action for U.S. Appl. No. 11/868,353, mailed Feb. 3, 2012 4 pages.
Notice of Allowance for U.S. Appl. No. 11/868,353, mailed May 17, 2012 7 pages.

(LEFT POSITION)

(NEUTRAL POSITION)

(RIGHT POSITION)

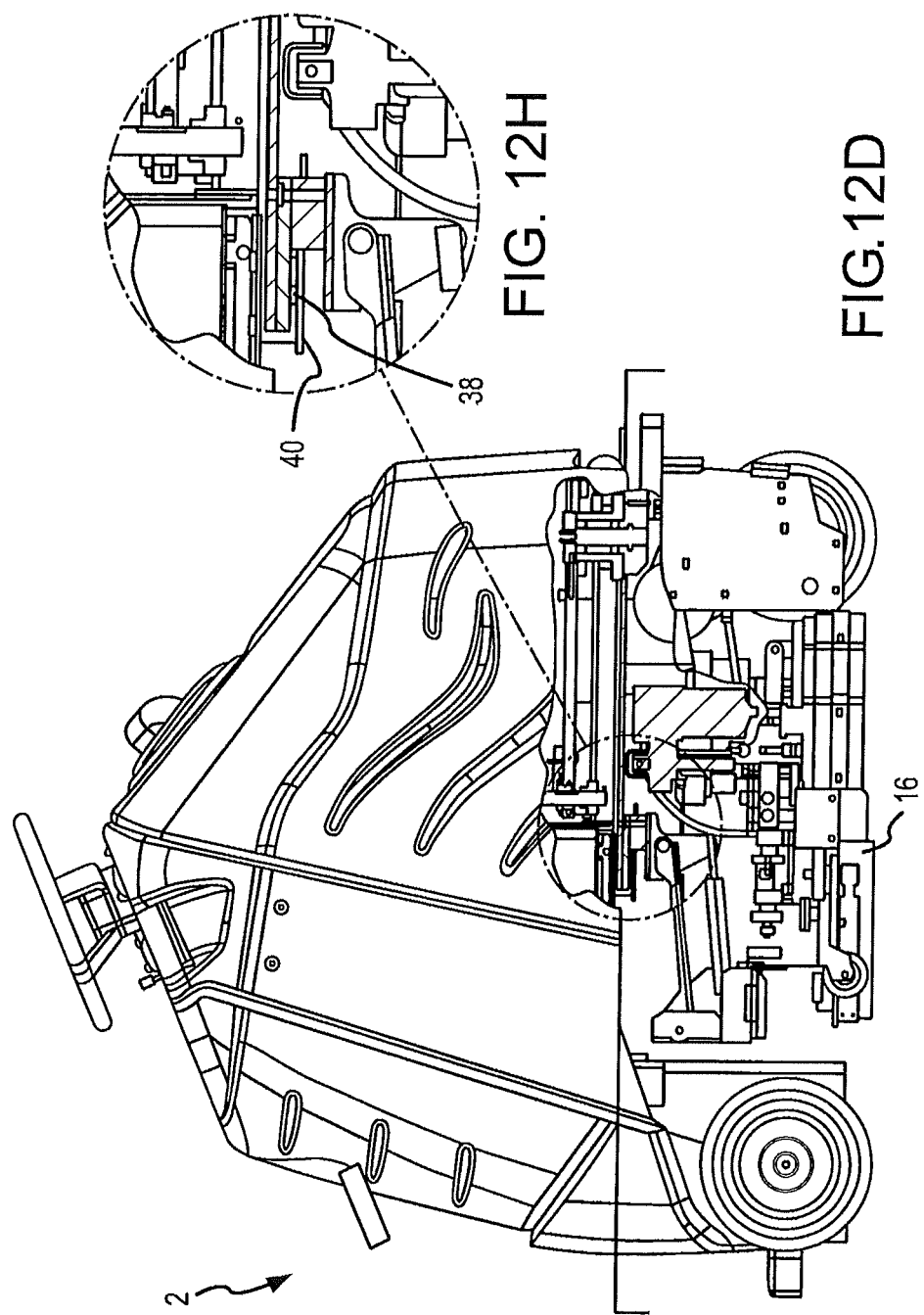

FLOOR TREATMENT APPARATUS

This application is a Divisional of U.S. patent application Ser. No. 11/868,353, filed Oct. 5, 2007, now U.S. Pat. No. 8,245,345, which is a Continuation of U.S. patent Ser. No. 11/059,663, now U.S. Pat. No. 7,533,435, filed Feb. 15, 2005, which claims the benefit of U.S. Provisional Patent Application Ser. Nos. 60/545,153 and 60/627,606, filed Feb. 16, 2004 and Nov. 12, 2004, respectively, and which is a Continuation-In-Part of abandoned U.S. patent application Ser. No. 10/737,027, filed Dec. 15, 2003, which is a Continuation-In-Part of abandoned U.S. patent application Ser. No. 10/438,485, filed May 14, 2003, the entire disclosures of which are incorporated by reference in their entirety herein.

This application is related to abandoned U.S. patent application Ser. No. 11/253,100, filed Oct. 17, 2005, which is incorporated by reference in its entirety herein.

FIELD OF THE INVENTION

The present invention relates to an apparatus for the treatment, such as cleaning, of a surface. More specifically, one embodiment of the present invention is an apparatus for surface cleaning that provides a standing or sitting location for the operator and is capable of operating in tight spaces.

BACKGROUND OF THE INVENTION

Cleaning machines are used extensively for cleaning flooring surfaces comprised of tile, stone, brick, wood, concrete, carpets and other common surfaces. Maintaining the cleanliness of these surfaces, especially in high volume areas in commercial, industrial, institutional and public buildings is an ongoing and time consuming process. The present invention relates to a highly maneuverable floor cleaning or treatment apparatus (hereinafter "treatment apparatus") that supports an operator during use. More specifically, some embodiments of the present invention are adapted to clean, sweep, vacuum, burnish, wax, etc. (hereinafter "treat") a floored surface, wherein the operator is supported by the cleaning device, thus increasing efficiency and productivity of the cleaning operation. As used herein, "floored surface", or more generally "surface", encompasses areas covered by concrete, tile, carpet, wood, plastic, stone, turf or any other substance known in the art. The prior devices address many issues that arise with cleaning such floored surfaces. Unfortunately, prior to the present invention, there was no one device that could address many, if not all, of the issues that arise in cleaning various surfaces in various environments at any given point in time.

A. Mop & Bucket Cleaning Devices

In the past, building maintenance staff and others often treat surfaces, such as tiled hallways or restroom floors, using traditional mop and bucket techniques. The bucket may include a detachable mop ringer and may be positioned on caster wheels to facilitate easy movement. Depending on the cleanliness of the equipment, a worker may be able to make a good start in treating a floor using the mop and bucket approach. However, soon the mop and fluid in the bucket becomes soiled or otherwise contaminated by germs and/or bacteria. From that point on, each time the worker plunges the mop into the bucket and rings the mop, both the mop and cleaning fluid become more and more dirty/contaminated.

B. Manually Propelled Cleaning Devices

The basic cleaning problems associated with the prior art mop & bucket approach to cleaning a surfaces have generally been addressed in the art, as shown in U.S. Pat. No. 6,206,980 to Robinson, entitled "Multi-functional Cleaning Machine," which is fully incorporated herein by reference. This type of cleaning machine generally includes a manually propelled wheeled body with two tanks, one concentrated chemical receptacle, a vacuum and blower motor and a fluid pumping system. Typically, such equipment includes only a single motor used for both vacuuming soiled fluid and blowing air that can be used to dry a cleaned surface. While such equipment is generally maneuverable and is an improvement over the earlier mop and bucket technology, the system is still labor intensive and slow. As a result, productivity of cleaning professionals, when using these type of systems is generally decreased over what it might be with other type of systems that are available.

C. Self Propelled Walk Behind Device

Productivity concerns have been addressed in the art by the creation of certain walk behind floor treatment apparatus. These apparatus typically have a scrub deck at machine's front and a squeegee at its rear. The squeegee has the ability to "swing" or follow the path of the scrub deck as the machine changes direction. This type of equipment is generally more efficient in cleaning large surface areas than either the mop and bucket or the manually propelled devices. Unfortunately, however, the distance between the scrub deck and squeegee is relatively great. Also, walkbehinds typically have relatively wide squeegees. These characteristics limit such machine's maneuverability and limit the doorways they can easily pass through. Typical 3' doorway allows a machine with no more than a 33" squeegee to fit through without removal.

Small walk behind floor cleaning apparatus typically include a scrub deck in the middle of the machine and squeegees at the machine's rear. In this configuration the squeegee has little or no ability to swing or follow the path of the scrub deck as the machine changes direction. Small rider scrubbers typically have relatively narrow squeegees, and rely on "side squeegees" (unvacuumized squeegee blades) adjacent to the scrub deck to direct the water into the path of the main (vacuumized) squeegee. The problem with these side squeegees is that they do not perform very well for very long and tend to leave a film of water in turns because the vacuumized squeegee does not follow the true path of the scrub deck, only the path of the side squeegees (which leave the film of water). Finally, side squeegee are typically very heavy rubber blades and have significant down-pressure applied to them to direct the water—this makes them expensive and causes significant "drag" which increases the work for the propel unit and limits battery run-time. Thus, while more maneuverable than larger walk behind floor treatment machines, the small machines typically do not clean as well as the larger machines.

D. Storage Issues in Prior Art Devices

Further, known cleaning machines do not provide adequate onboard storage for cleaning supplies, tools, etc. Likewise, prior art machines do not often provide a flexible approach to adding storage facilities for trash and the like when the need for such arises. Machinery that addresses these issues is therefore needed.

E. Self-Propelled Ride-On Devices

Self-propelled cleaning devices are generally also well known in the field and are employed to treat large floored surfaces, such as tiled, concrete or carpeted floors found in hospitals, department stores, schools, gyms, etc. These devices generally provide the operator with seating from which he/she can control operation of the device. These devices are ideal for cleaning large, open areas because they are capable of containing large amounts of waste fluids and/or debris without having to repeatedly perform time consuming fluid replacement or debris removal. Moreover, because these devices provide the user with seating, the user does not become prematurely fatigued, increasing overall worker productivity. Unfortunately, these large ride-on machines are not particularly well-suited for cleaning smaller, more confined floor surfaces, which are often found in hallways, small rooms, or even large rooms which have many obstacles therein.

As is well known in the art, smaller self-propelled cleaning devices are also in existence that are ideal for cleaning the smaller rooms and hallways. However, smaller devices are usually pushed or pulled by an operator. Hence, the major drawback of these devices is that they often rely on operator strength to maneuver the device. Even if the device is self-propelled, it often employs manual steering. After a long shift of walking behind a treatment device, the operator is bound to become fatigued, wherein his or her attention will deviate from the task at hand, thereby possibly resulting in uneven treatment to the floored area. Thus, a subsequent crew may have to return and retouch certain areas that were not accurately treated during the first operation. In addition, human errors related to the amount of time a surface is exposed to a brush, may occur when the operator lingers over a single area for extended period of time. This situation is never good for a floor surface. The devices in the art are also difficult to maneuver and often are not adapted to operate around tight corners, wherein pre or post cleaning operations must be performed, thus increasing the time and expense of the entire task.

Thus, it is a long felt need in the field of floor cleaning or treatment to provide a device that allows the operator to ride thereon, and which is adapted to be used in small areas and/or around tight corners. The following disclosure describes an improved floor cleaning and treatment device that is adapted for use in small areas that includes a platform adapted to support the operator to ensure optimum floor cleaning or treatment.

SUMMARY OF THE INVENTION

It is one aspect of the present invention to provide a floor treatment apparatus that is easy to maneuver. More specifically, one embodiment of the present invention is constructed of a chassis section that includes an enclosure that houses at least a portion of the internal components of the treatment device and a location for installation of devices that are used during cleaning operations. In addition, one embodiment of the present invention provides a standing, leaning or sitting location for the operator. Another embodiment of the present invention is equipped with a powered steering device that allows for greater maneuverability in areas with tight corners, thereby ensuring that more of the flooring surface is treated without having to perform pre or post treatment operations. More specifically, one embodiment of the present invention is equipped with a self-propelled wheel and an easy to use steering device to provide increased maneuverability around obstacles. One embodiment of the present invention employs at least one wheel that provides thrust and/or steering capability. Yet another embodiment of the present invention employs wheels that are substantially centered under the chassis such that the entire apparatus is generally capable of 360° rotation without substantially traversing in any other direction, thus allowing it to treat tight corners of a surface. It is another aspect of the present invention to provide a cleaning apparatus that is cost effective to manufacture. Various aspects of the invention shall now be described in more detail.

Chassis

One embodiment of the present invention employs a chassis section that is designed to protect and house the internal workings of the apparatus and provide a location for interconnection of auxiliary treatment devices used therewith. One embodiment of the present invention employs a chassis that is constructed of rigid plastic, metal, or other common materials used in the art. The chassis of this embodiment also is equipped with a platform for the operator. Alternative embodiments of the present invention employ a foldable, removable or stationary operator seat. In addition, other safety features such as pads or belts may be employed to secure the operator into the cleaning device and thus his/her working environment.

It is yet another aspect of the present invention to provide a chassis with a small envelope. More specifically, one embodiment of the present invention is small enough to fit into and through tight spaces. Often facilities that employ the apparatus of the present invention include narrow door ways, aisles and elevators. In addition, especially in older buildings that have been retrofitted to comply with the Americans with Disabilities Act, elevators are of minimal volume and lifting capability. To fit into small elevators, the chassis is designed to have the smallest practical envelope, a distinct advantage over the prior art. Also, the apparatus of one embodiment of the present invention includes components that are easily removable or adjustable to reduce the profile of the apparatus. Thus, the embodiments of the present invention may be used in various structures.

Steering Mechanism

Another aspect of the present invention is to provide a cleaning apparatus that is easy to operate and maneuver. More specifically, one embodiment of the present invention is equipped with a steering mechanism that allows for inputs from the operator to be efficiently communicated to the steering wheels of the cleaning apparatus. Alternatively, other steering means may be used to facilitate maneuverability of the treatment apparatus, such as joy sticks, touch screens, buttons, remote control elements, etc.

It is still yet another aspect of the present invention to provide a cleaning apparatus that is adapted to efficiently clean areas with tight corners. More specifically, one embodiment of the present invention is adapted to generally perform 360° turns without appreciable lateral motion. This embodiment of the present invention is equipped with a turning mechanism generally under the center of the chassis with two powered exterior wheels adjacent thereto that provide power to the chassis to pivot around the centered wheel. The powered exterior wheels may be independently controlled by joy sticks, wherein movement thereof send directional inputs to each wheel. One embodiment of the invention is equipped with at least one joy stick wherein forward deflection will impart forward motion, rearward deflection will impart rearward motion, and a side-to-side deflection will cause the apparatus to turn. Alternatively, two joy sticks may be used in a similar manner, wherein rearward deflection of the left joy stick and forward deflection of the right joy stick will result in a left turn, and depending on the placement of the powered wheels, perhaps a 360° left hand turn.

Another embodiment of the present invention utilizes a steering wheel, handle bars, a yoke, or similar apparatus for steering. Embodiments may also include a power-assisted steering mechanism.

Power Plant

It is another aspect of the present invention to provide a treatment apparatus that is powered by commonly used power plants. More specifically, one embodiment of the present invention employs an electric motor to power the apparatus. The electric motor may be powered by batteries, solar energy or an electrical cord attached to a permanent power source.

Alternatively, the present invention may be powered by an internal combustion engine. Other propulsion means may also be employed by the present invention without departing from its scope, as will be appreciated by one skilled in the art.

Floor Treatment Devices

One embodiment of the present invention employs a chassis that houses a fluid pump assembly and a vacuum assembly. The apparatus further includes at least two tanks, one for retaining a base cleaning fluid, such as water, and a second for retaining spent cleaning solution, dry debris, etc. The apparatus may also include one or more concentrated cleaning chemical receptacles designed to hold concentrated cleaning chemicals. The receptacles are preferably stored within a lockable structure, adding safety to the overall apparatus. These agents can be added to a base cleaning fluid just prior to application to a surface and as desired to facilitate cleaning of various surfaces.

Tanks

As briefly mentioned above, preferably at least one tank is provided that provides a solution that is directed towards the flooring surface to be cleaned to facilitate treatment. The tank may be constructed with multiple compartments wherein waste water from the surface is contained prior to disposal. More specifically, one embodiment of the present invention employs a tank that includes a movable membrane. In this configuration, the clean water and/or cleaning solution is deposited on a surface and agitated. Dirty water is next suctioned up and deposited back into a portion of the tank, thereby moving a membrane accordingly to accept the dirty water. Such a configuration is disclosed in U.S. Pat. No. 4,759,094, which is herein incorporated in its entirety by this reference. A similar selectively expandable fluid storage area can be created by utilizing a collapsible structure, which is placed inside of the primary fluid tank. This type of arrangement is disclosed in U.S. Pat. No. 4,196,492, which is also incorporated herein in its entirety by this reference.

Clean water can obviously come from an outside source such as a hose, rather than be stored on board the device. However, in order to facilitate maneuverability and usability of the present invention, it is envisioned that the chassis will house or hold at least one fluid tank and perhaps a plurality thereof.

Cleaning Solutions

In one type of treatment operation, fluid from the chemical receptacles flows through a tube to a chemical selector, which may include a metering valve. The selector preferably has a positive shut-off position, wherein fluid is prevented from flowing through the selector regardless of the fluid pressure in a fluid line. The selector is responsive to input from an operator selection of one of the several cleaning chemicals. Once a chemical is selected, it is free to flow through the chemical selector and appropriate amounts thereof may be provided to one of any number of inlets to a mixing tee. The amount of chemical allowed to flow may be adjusted by a metering valve built into the selector or separate from the selector, in a known fashion. A base cleaning fluid, such as water, may flow from a fluid tank and through a separate tube to a second leg of a mixing tee. The cleaning fluid and concentrated cleaning chemical then mix within the mixing tee to create a cleaning solution. That solution may then be passed through the selector outlet to a pressure pump, wherein the cleaning solution may be pressurized and communicated via appropriate tubing to a dispensing device. The pump, which draws fluid to and through the selector, also preferably includes a bypass system to facilitate regulation of pump pressure. Use of the pump to draw fluid is preferred as it does not create unwanted pressures in the fluid lines and the system, in general, is not subject to gravity feeding of fluid.

A solution may be applied to a surface using any type of dispensing device. In a preferred embodiment, the dispensing device or associated solution lines or tubes include an adjustable valve, which may be used to adjust the pressure and flow of solution allowed to exit the dispensing device. Because of the adjustability, the apparatus may be utilized as a pre-cleaner for various carpet treatments, including spotting or other treatments.

By use of the chemical selector, two or more receptacles of floor treatment chemicals may be fluidly connected to a mixing tee. In operation, a user is capable of creating any number of cleaning solutions without the need for adding receptacles or switching chemical feed lines from one receptacle to another or without changing metering tips that are easily misplaced, incorrectly interconnected, or damaged. Thus, the treatment process is safer because there is less chemical handling. Similarly, use of a metering valve will allow the operator to create a very precise floor treatment solution.

It is preferred that one-way check valves be used throughout the apparatus. For instance, check valves may be included in: delivery lines that supply cleaning chemicals to the metering tee; lines that supply water to the metering tee; lines that supply cleaning solution to the pump; lines that supply cleaning solution to the spray gun; or in the metering tee, itself. The check valves prevent reversal of fluid and prevent contamination of one fluid with another.

Blower

The treatment apparatus also may include a modular blower assembly. The blower assembly may be hand-held and operate completely apart from the overall cleaning machine. The blower assembly may be used to dry areas physically separate from where the apparatus is stored. Because the blower assembly possibly is separate from the apparatus, it may also be used for other blowing functions, such as blowing leaves, grass, dirt or other debris. The blower assembly may be used with a detachable hand nozzle, a flexible nozzle, an extension wand, etc., thereby increasing the overall flexibility of the blower assembly. The blower assembly may utilize an integrated on/off switch and be powered by electricity supplied by any typical extension cord, including the power source of the apparatus. The blower may be configured to be stored on the apparatus in one of any number of convenient ways. It will be appreciated by one skilled in the art that having a modular blower assembly of this type is very beneficial to the overall functionality of a multifunctional floor treatment apparatus.

Storage

Another aspect of one embodiment of the present invention is that the chassis includes bins, trays, bays and other storage devices preferably within easy reach of the operator. The storage devices provide the operator with substantial flexibility when cleaning a large building or area that has many types of surfaces that may need treatment. Also, the apparatus provides for modular trash/supply bins that may be added to or removed from the apparatus quickly and easily so that the machine can be configured for one of any number of floor treatment activities.

Primary Pump

It is yet another aspect of the present invention to provide an apparatus equipped with a secondary fluid pump that supplies fluid to the main fluid pump prior to ignition. More specifically, one embodiment of the present invention includes a secondary, or priming pump, which is activated prior to the activation of the main fluid pump. Often it is desirable to introduce fluid into a main fluid pump prior to that pump's activation, thereby expelling trapped air that may cause damage to the main fluid pump motor from vapor lock or cavitation, for example. This priming process may be conducted manually, but that is time consuming, wherein the user manually adds fluid to the pump or bleeds the air therefrom. Alternatively, and preferably, one embodiment of the present invention is equipped with a secondary pump that is activated for a brief moment when the fluid discharge apparatus is initially activated, thus ensuring that the main fluid pump will be substantially free of trapped air upon activation.

Squeegee

It is another aspect of the present invention to provide a device that includes a squeegee adjacent to the floor treatment device, both generally in the middle of the machine. The squeegee effectively swings, or follows the path of the floor and does not rely on unvacuumized side squeegees to channel water to the main vacuumized squeegee. Thus, it offers as good or better fluid pick-up when the apparatus is turning than is capable with a walk behind scrubber, and far superior than typical small riders since it does not rely on smearing side squeegees. One embodiment of the present invention, employs a squeegee that pivots about the steering axis with a linkage that is supported by a roller and track mechanism. The absence of side squeegees mean less drag and better use of available energy. In addition, some embodiments of the present invention include an adjustable squeegee, a skirt or a shroud that minimally contacts the floor, thus reducing drag and sparing battery charge. Alternatively, some embodiments of the present invention include stops that contact the floor, without marring the same.

Use of the Device

Various aspects of the inventions discussed briefly above combine to provide an effective and efficient tool, useful in the treatment of numerous areas in and around commercial, industrial, institutional and public buildings. Moreover, due to the various aspects of the present invention, a sanitation maintenance worker may clean a particular room or facility more efficiently than previously possible. The present invention may be used in various cleaning operations such as burnishing, vacuuming, scrubbing, sanding, waxing, sweeping, sealing, painting, polishing, etc. In order to accomplish these tasks, the present invention may be equipped with various combinations of floor treatment devices. More specifically, one embodiment of the present invention is equipped with a plurality of brushes and squeegees to agitate and collect debris from a flooring surface. In addition, suction mechanisms may be employed such that fluids and/or dry particulate matter are transferred into a container. It is also envisioned that one embodiment of the present invention include at least one solution applicator positioned adjacent to the scrub brushes, wherein solution is injected onto the surface after, or prior to, agitation by the brushes. The debris-entrained solution is then collected by the squeegee and subsequently vacuumed into the holding tank or expelled out of the chassis to an outside reservoir. The brushes and/or solution used in this embodiment may be adapted to clean, sweep, paint, burnish, sand, strip, varnish or wax a floor. It will be appreciated by one skilled in the art that any type of solution adapted to treat any flooring surface may be employed without departing from the scope of the present invention.

It is yet another aspect of the present invention provide a floor treatment apparatus that can be used in various floor maintenance operations. More specifically, one embodiment of the present invention is adapted for interconnection to a plurality of devices to perform a variety of floor treatment operations. It is envisioned that one embodiment of the present invention be capable of quick removal of certain treatment devices such that different devices may be then added to quickly change the scope of the apparatus, thereby providing a device adapted to scrub, clean carpets, wax floors, burnish floors, remove wax or varnish from floors, vacuum, etc. Thus, it is contemplated, that this system may be used for a plurality of cleaning or floor treatment operations.

Remote Control

It is yet another aspect of the present invention to provide a highly mobile floor treatment apparatus that can include a car washer assembly. As will be appreciated by those skilled in the art, if so configured, the device could include a car washer wand connected to appropriate pumps and could be utilized to pre-clean heavily soiled areas prior to final cleaning with use of the device.

It is still another aspect of the present invention to provide a floor treatment apparatus that does not require direct contact with an operator to perform its tasks. More specifically, one embodiment of the present invention is adapted to be remote controlled. This embodiment of the present invention is equipped with remote control mechanisms and software currently known in the art, such as taught by U.S. Pat. No. 6,625,843 to Kim et al., which is incorporated in its entirety herein. In addition, this embodiment of the present invention may be equipped with the plurality of cameras such that offsite monitoring and control may be performed. In a related embodiment of the present invention, software is installed in the cleaning apparatus such that human contact or monitoring is not required. More specifically, one embodiment of the present invention is adapted to learn its environment as it operates in an area such that remote controlling is not required. Alternatively, it is well within the scope of this invention to preprogram the dimension of floored surfaces into the smart treatment device, wherein the device is parameterized with the surface dimensions before the task is initiated. Apparatus of this type are known in the art, such as the Roomba™ device by iRobot Corporation, aspects of which are described in U.S. Pat. Nos. 6,594,844 and 6,535,793, which are both incorporated in their entirety herein.

Safety

It is another aspect of the present invention to provide a cleaning apparatus that is safe and comfortable to use. More specifically, one embodiment of the present invention includes an operator platform. This platform allows the operator to stand on the device during the treatment operation, thus increasing productivity and lowering the chances of injury or fatigue to the operator. It another embodiment of the present invention, a seat is provided wherein the operator may comfortably sit while completing his or her task. Other safety and comfort features such as rails, pads, and belts, may be provided depending on the needs of the operator.

Thus, it is one aspect of the present invention to provide a floor treatment apparatus which comprises:

a chassis with a lower surface, a front surface, an upper surface, a rear surface, a left surface and a right surface, wherein a platform is provided that is adapted to support the weight of an operator;

a powered wheel operably connected adjacent the lower surface of the chassis, the powered wheel being capable of at least one of transitioning and rotating the floor treating apparatus;

a steering mechanism adjacent to the upper surface that is accessible by the operator;

an operable floor treating device connected adjacent to the lower surface of the chassis;

an operable debris collection device connected adjacent to the lower surface of the chassis; and wherein an operator controls the floor treatment apparatus from the platform.

The Summary of the Invention is neither intended nor should it be construed as being representative of the full extent and scope of the present invention. Some aspects of the present invention are set forth in various levels of detail in the Summary of the Invention, as well as in the attached drawings and the Detailed Description of the Invention. No limitation as to the scope of the present invention is intended by either the inclusion or non-inclusion of elements, components, etc. in this Summary of the Invention.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these embodiments.

FIGS. 12A-H are views of a rotatable squeegee for use in one embodiment of the present invention;

Figure 1:
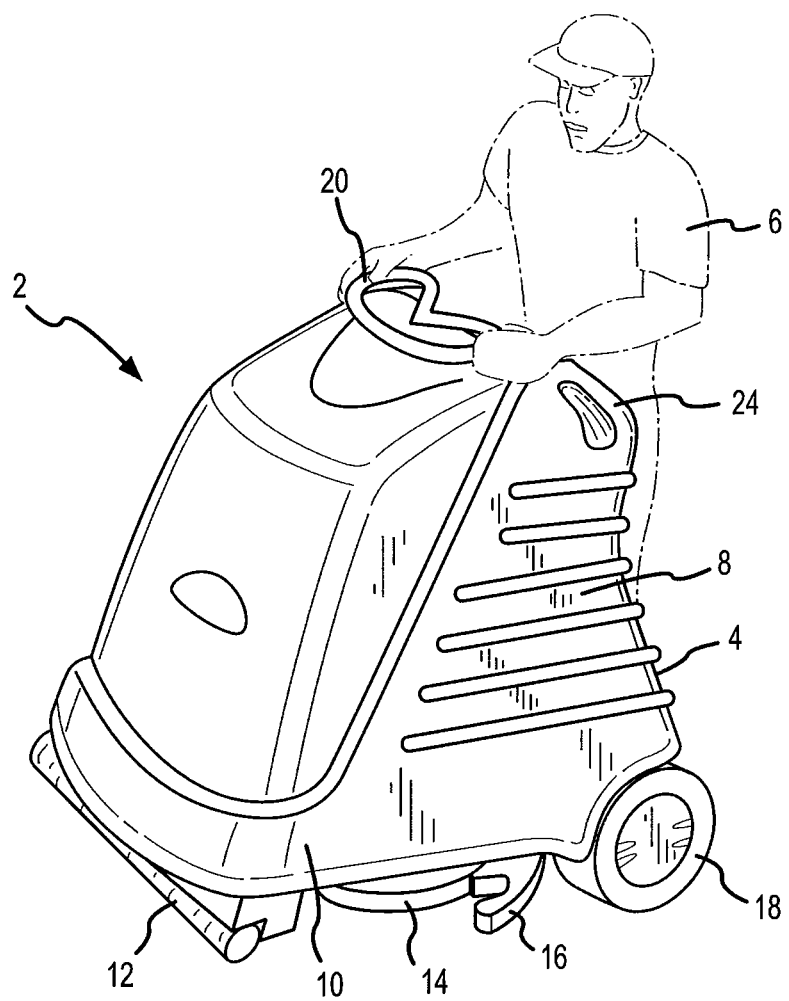
FIG. 1 is a perspective view of one embodiment of the present invention showing an operator standing on the platform thereon.

To assist in the understanding of the present invention the following list of components and associated numbering found in the drawings is provided herein:

| Component | # |
| --- | --- |
| Floor treating apparatus | 2 |
| Platform | 4 |
| Operator | 6 |
| Chassis | 8 |
| Bottom surface of chassis | 10 |
| Brush | 12 |
| Rotating brush | 13 |
| Scrubber | 14 |
| Squeegee | 16 |
| Wheel | 18 |
| Steering wheel | 20 |
| Joy stick | 22 |
| Handle Grip | 24 |
| Powered wheel | 26 |
| Burnishing pad | 28 |
| Swinging brush | 30 |
| Wand | 32 |
| Hose | 34 |
| Swing arm | 36 |
| Bearing | 38 |
| Track | 40 |
| Pivot point | 42 |
| Handle | 44 |
| Cam | 46 |
| Strainer basket | 48 |
| Waste tank cover | 49 |
| Waste fluid intake | 50 |
| Main Storage Tank | 51 |
| Clean fluid intake | 52 |
| Fitting | 54 |
| Flange | 56 |
| Waste fluid bag | 58 |
| Mandrill | 60 |
| Drain hose | 62 |
| Band Clamp | 64 |
| Rear cowling | 66 |
| Battery | 68 |
| Tray | 70 |
| Drink holder | 72 |
| Cowling pad | 74 |
| Control panel | 76 |
| Fastener | 77 |
| Operator presence switch | 80 |
| Throttle | 82 |
| Seat | 84 |
| Adjustment Mechanism | 85 |
| Hook | 86 |
| Front cowling | 88 |
| Light | 89 |
| Vacuum fan | 92 |
| Vacuum exhaust channels | 94 |
| Waste H2O return hose | 96 |
| Hose channel | 98 |
| Tip over stops | 100 |

It should be understood that the drawings are not necessarily to scale. In certain instances, details which are not necessary for an understanding of the invention or which render other details difficult to perceive may have been omitted. It should be understood, of course, that the invention is not necessarily limited to the particular embodiments illustrated herein.

DETAILED DESCRIPTION

Referring now to FIGS. 1-20 an apparatus 2 for cleaning or otherwise treating a floor surface is shown. More specifically, one embodiment of the present invention includes a chassis 8 with a platform 4 that is adapted to support the weight of an operator 6, thus increasing the efficiency of the entire floor treatment operation. In addition, various cleaning or floor treatment components may be interconnected to the bottom surface 10 of the chassis, such as brushes 12, scrubbers 14, squeegees 16, vacuum shoes, etc.

The chassis 8 also includes a plurality of wheels 18 operably interconnected to the bottom surface 10 to enable steering and provide stability. It is contemplated that the operator 6 will stand on the platform 4 and steer the apparatus 2 with either a steering wheel 20 or other type of steering mechanism, such as a joy stick 22. Such an embodiment of the present invention enables the floor surface to be cleaned or otherwise treated more efficiently, since the operator 6 does not have to push or pull an often heavy apparatus 2. In addition, since the human component of powering or otherwise moving the apparatus 2 is omitted, more consistent flooring treatment is achieved, thereby saving materials and reducing costs of the entire operation.

Referring now to FIG. 1, one embodiment of the present invention is shown. More specifically, the chassis 8 which includes the platform 4 adapted to support the operator 6 during the floor treatment operation is shown. The operator 6 preferably stands on the platform 4 that is generally parallel to the flooring surface. Preferably, the platform 4 is tilted, rear edge higher than the front edge, between about 3 to 8 degrees to increase ergonomics. However, as it will be appreciated by one skilled in the art, other support devices, such as seats, which may be operably folded into the chassis 8, may be provided to increase the comfort level of the operator 6. In addition, the embodiment of the present invention shown in FIG. 1 is equipped with a steering mechanism, such as a wheel 18, that allows the operator 6 to easily maneuver the apparatus 2 around the flooring surface.

The chassis 8 is constructed of any material, but preferably hard plastic will be used to reduce the weight of the apparatus 2. As shown herein, a plurality of wheels 18 are operably interconnected to the rear of the apparatus 2 to provide stability and perhaps power for locomotion. In addition, a squeegee 16 is included that is adapted to extract or funnel water or debris to a location where it is extracted via vacuum into a container generally, but not always, located at least partially inside the chassis 8. Further, this embodiment of the present invention includes a brush 12 that is used to agitate the flooring surface to loosen dirt, wherein spray nozzles may be employed situated behind the brush 12 to treat the flooring and capture the dirt so that it can be gathered by the squeegee 16 and suction system of the apparatus 2.

Figure 2:
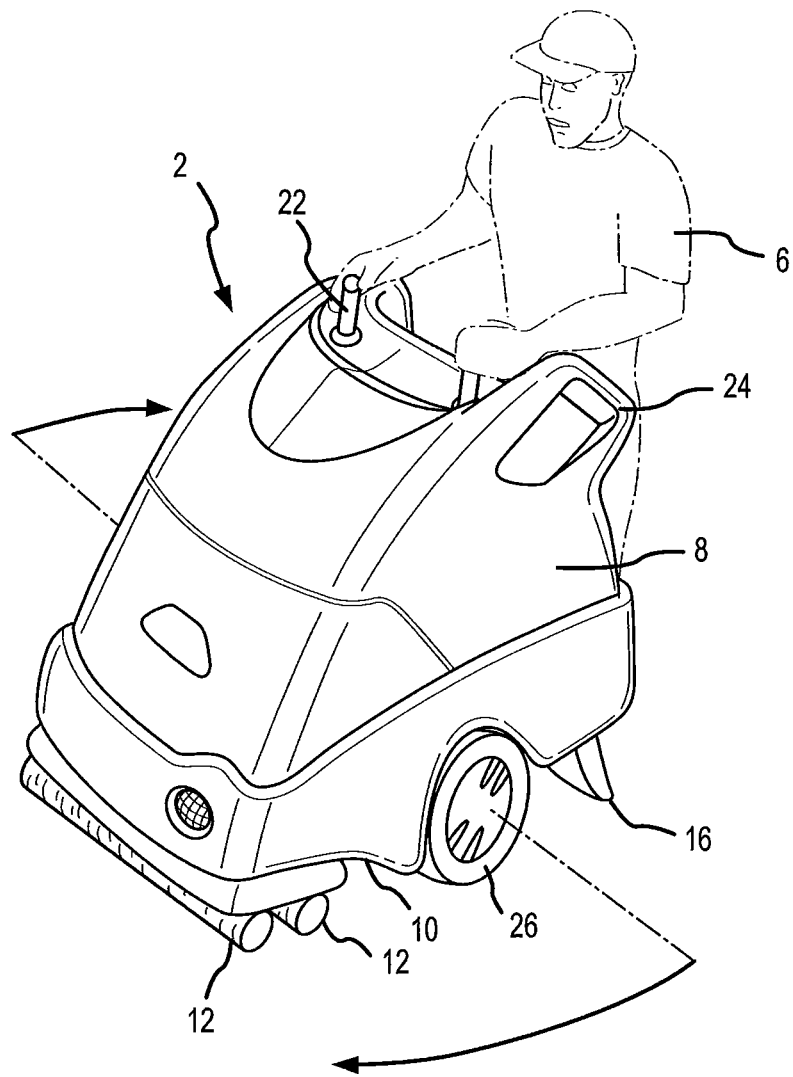
FIG. 2 is a perspective of an alternate embodiment of the present invention that is configured for fluid extraction, and which is controlled by at least one joy stick.

Referring now to FIG. 2, an alternate embodiment of the present invention that is used mainly for fluid extraction is shown. This embodiment of the present invention is similar to the apparatus described above, however alternate components are interconnected to the bottom surface 10 of the chassis 8 such that the apparatus is adapted to efficiently capture fluids or debris deposited on a floored surface. More specifically, this embodiment of the present invention is equipped with at least one brush 12 adapted to agitate water and/or debris and a squeegee 16 that is positioned adjacent to the rear surface of the chassis 8 that contains fluid and debris as the apparatus 2 moves forward. In one embodiment of the present invention, a suction device, such as a vacuum shoe, is positioned near the squeegee 16 such that dirty water is vacuumed from the surface and transferred back into a tank situated inside or adjacent to the chassis 8. Alternatively, another embodiment of the present invention is provided with a squeegee 16 with a plurality of suction holes that are the terminus of conduits that transport waste water to the storage tank.

In the illustrated embodiment, the operator 6 is able to control the apparatus 2 with a plurality of joy sticks 22. In addition, hand grips 24 are provided on the sides of the operator 6 to increase safety. Further, this embodiment of the present invention employs powered wheels 26 that allow the entire system to rotate on a single vertical axis without substantially transitioning in other directions. More specifically, this embodiment of the present invention is capable of performing a 360° turn, which aids cleaning of tight spaces.

Figure 3:
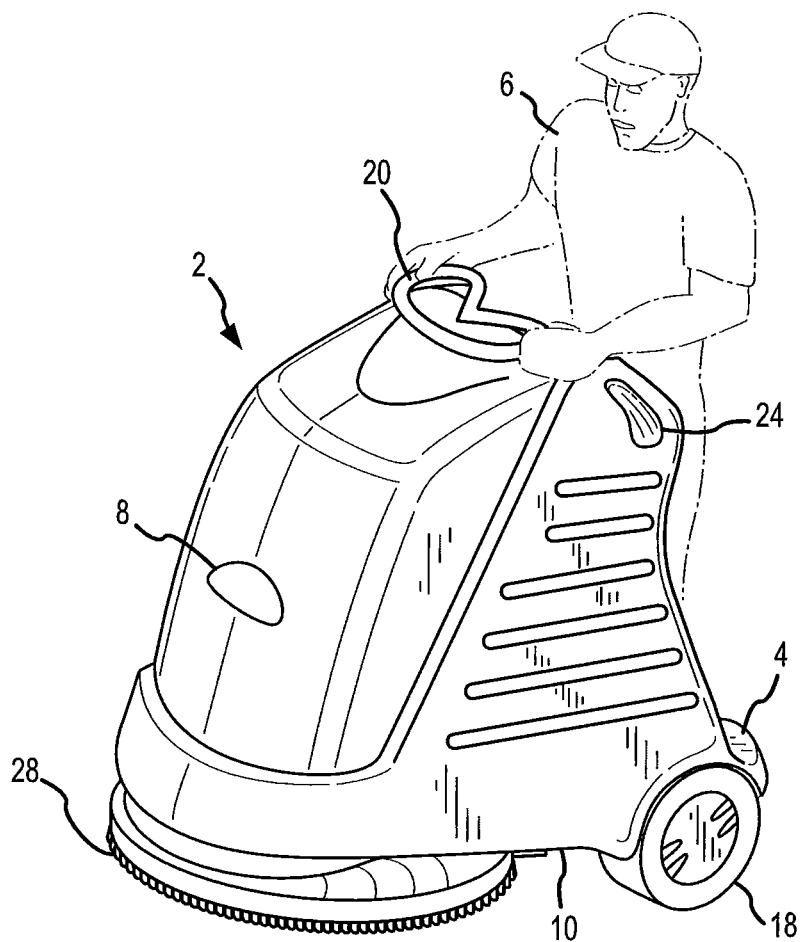
FIG. 3 is a perspective view and alternative embodiment of the present invention that is configured for burnishing operations.

An alternate embodiment of the present invention that is used for burnishing is shown in FIG. 3. This embodiment of the present invention includes a burnishing pad 28 operably interconnected to the bottom surface of the chassis 10. As before, the operator 6 stands on a platform 4 built into the chassis 8. One skilled in the art will appreciate that this embodiment of the present invention may also include a device for suctioning debris left over from the burnishing process, such as dust or wax particulates, for example.

Figure 4:
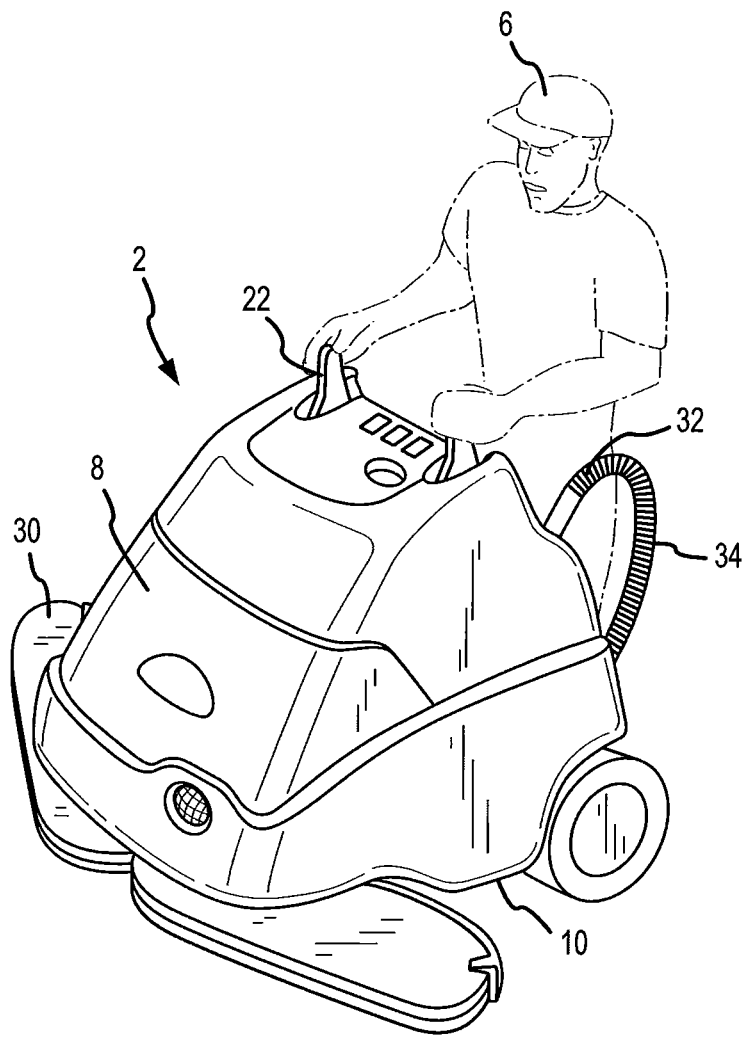
FIG. 4 is a perspective view of an alternative embodiment of the present invention that is equipped with moveable brushes that are adapted to swing out to more efficiently treat a floor surface, and which also includes a wand for selectively cleaning difficult to reach areas.

Referring now to FIG. 4, an alternate embodiment of the present invention that employs swinging brushes 30 is shown. This embodiment of the present invention is very similar to those described above, however the brushes 30 used to agitate, scrub, or burnish are rotatably interconnected to the bottom surface 10 of the chassis 8. More specifically, the brushes 30 of this embodiment are capable of independently folding inwardly, thereby efficiently cleaning the interior portion of a floor when the apparatus is operating near a vertical surface such as a wall. As shown herein, the brushes 30 are independently movable and preferably spring loaded outward such that contact with a vertical surface causes the brush 30 to fold under the chassis 8. Alternatively, as one in the art will appreciate, the orientation of the brushes may be controlled by the operator. In addition, a wand 32 interconnected to a hose 34 may also be employed with this embodiment of the present invention to allow for selective application of cleaning solution or suction.

Figure 5:
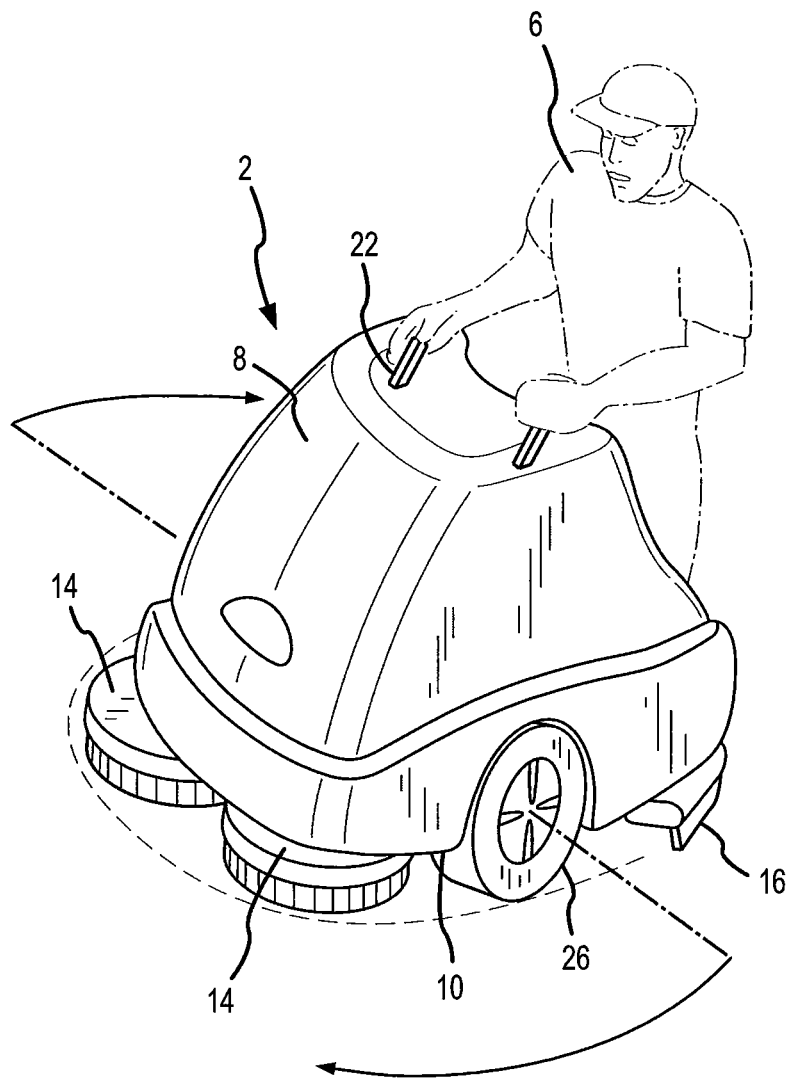
FIG. 5 is a perspective view of an alternative embodiment of the present invention that is designed to rotate about an 360° axis without significantly traversing in other directions.

Referring now to FIG. 5, another embodiment of the present invention that utilizes centered powered wheels 26 is shown. More specifically, this embodiment of the invention is similar to those described above, however it is equipped with a plurality of wheels 26 that allow a 360° turning capability. This embodiment of the present invention is also similarly adapted for cleaning the surface of a floor with a brush 12 or a plurality thereof that is used to agitate the dirt wherein a squeegee contains and suctions debris into a container.

Figure 6:
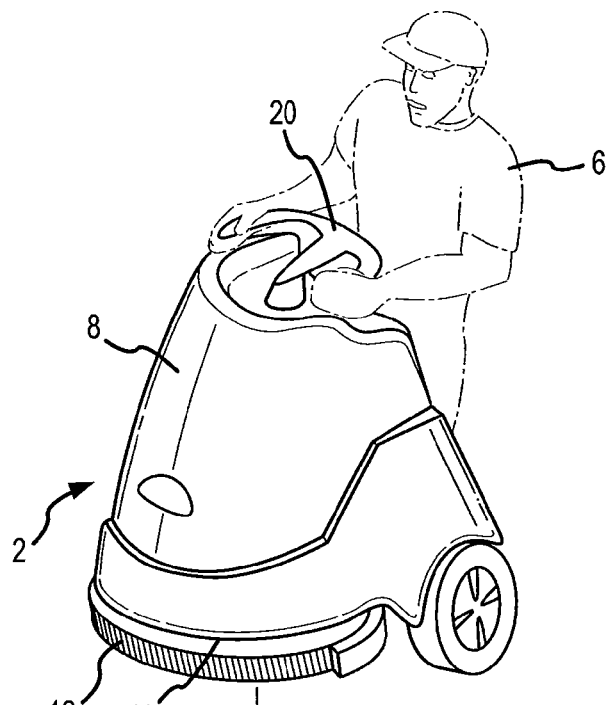
FIG. 6 is a perspective view of an alternative embodiment of the present invention that is designed to reach tight areas of floor surface.
Figure 7:
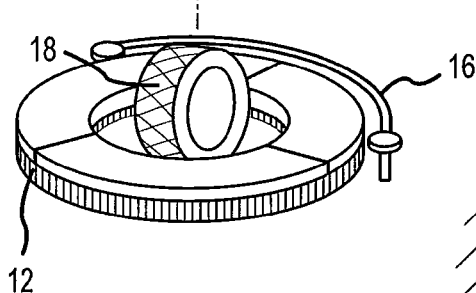
FIG. 7 is a detailed perspective view of the embodiment shown in FIG. 6, showing the steering wheel, brush, and squeegee assembly used therewith.
Figure 8:
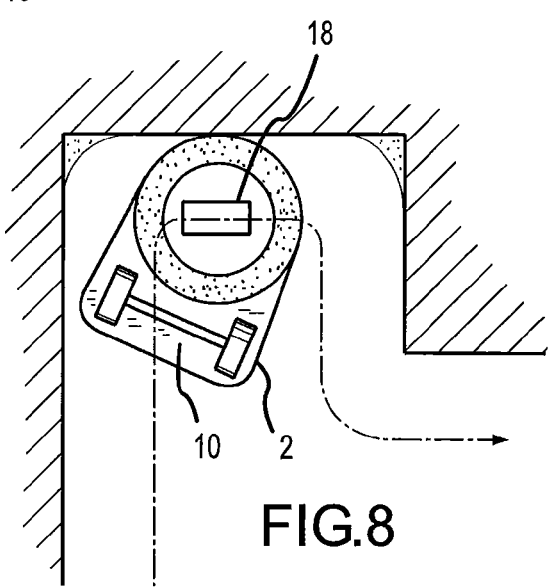
FIG. 8 is a top plan view of a flooring surface.

Referring now to FIGS. 6-8, an alternate embodiment of the present invention is shown that is equipped with a wheel 18 with brushes 12 therearound for cleaning in all directions. This embodiment of the present invention is equipped with brushes 12 that allow for cleaning or agitation of the flooring surface in any direction the apparatus 2 is moving, thus efficiently cleaning flooring without having to make multiple passes over the surface.

Figure 9A:
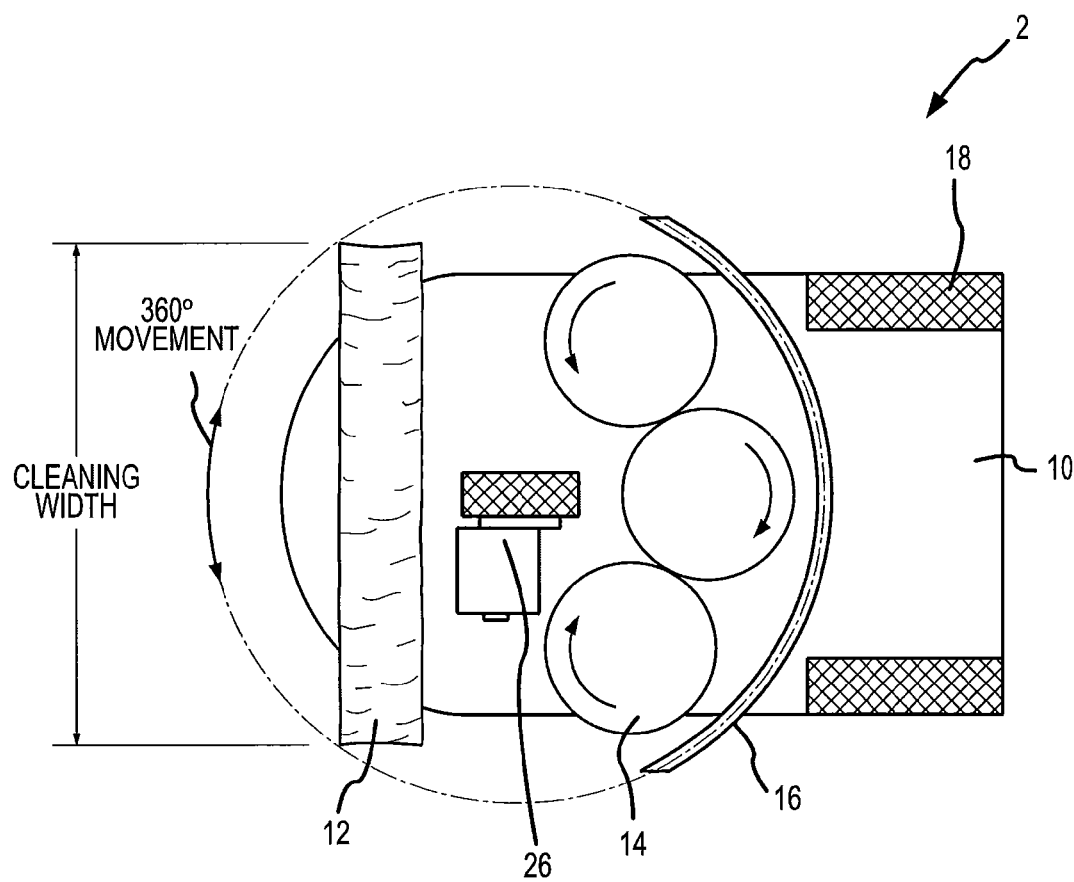
FIGS. 9A-B are bottom plan views showing configurations of steering, cleaning, and power mechanisms.
Figure 9B:
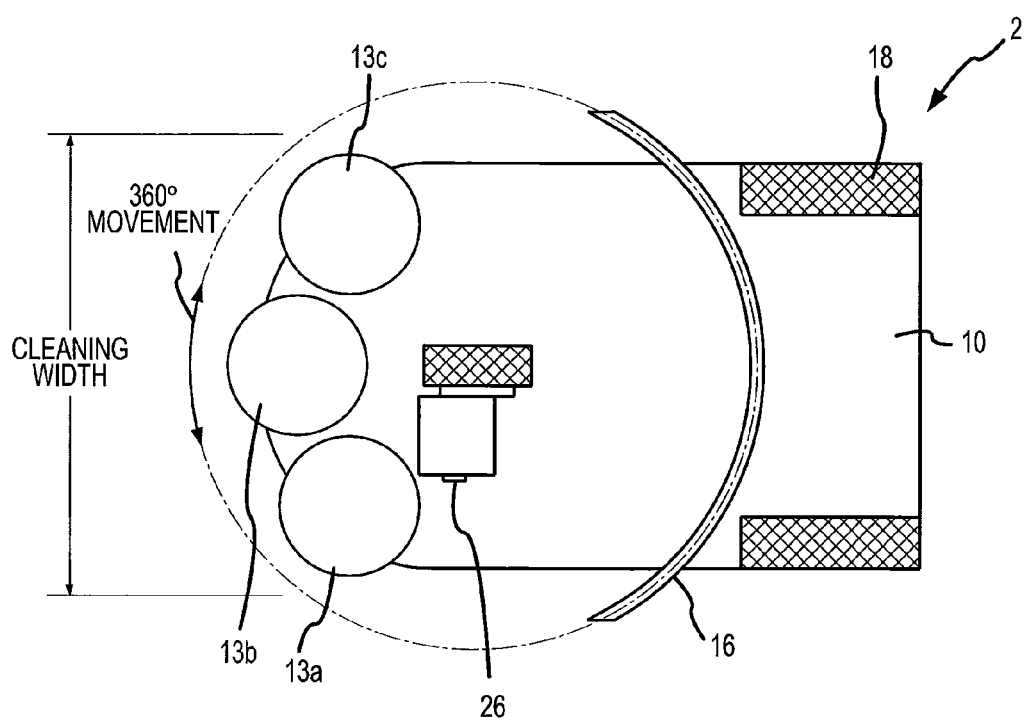

Referring now to FIG. 9A-B, one configuration of cleaning components interconnected to the bottom surface 10 of the chassis 8 is shown. More specifically, one embodiment of the present invention is adapted to either sweep or clean a floor. In the illustrated embodiment, a presweeping brush 12 agitates the carpet or hardwood floor to loosen debris. Next, rotating scrubbing brushes further agitate the surface and perhaps add fluid and cleaning solution thereto to help loosen and contain any loose debris. Finally, a squeegee 16 and preferably a suction system is provided that captures the dirty water as the apparatus is moved forward. As shown herein, the drive unit is the center wheel 26, which is also adapted to selectively rotate upon steering commands from the operator 6.

FIG. 9B shows a configuration of cleaning components interconnected to the bottom surface 10 of the chassis 8 similar to what was shown in FIG. 9A. The difference, however, is that the pre-sweeping brush 12 has been replaced by three scrub brushes or three rotating brushes, 13A, 13B and 13C that may be used to either sweep, burnish or combinations thereof a floor surface. The brushes can rotate at speeds desired by the operator or at preselected speeds and in directions selected by the operator or in pre-selected directions.

Figure 10:
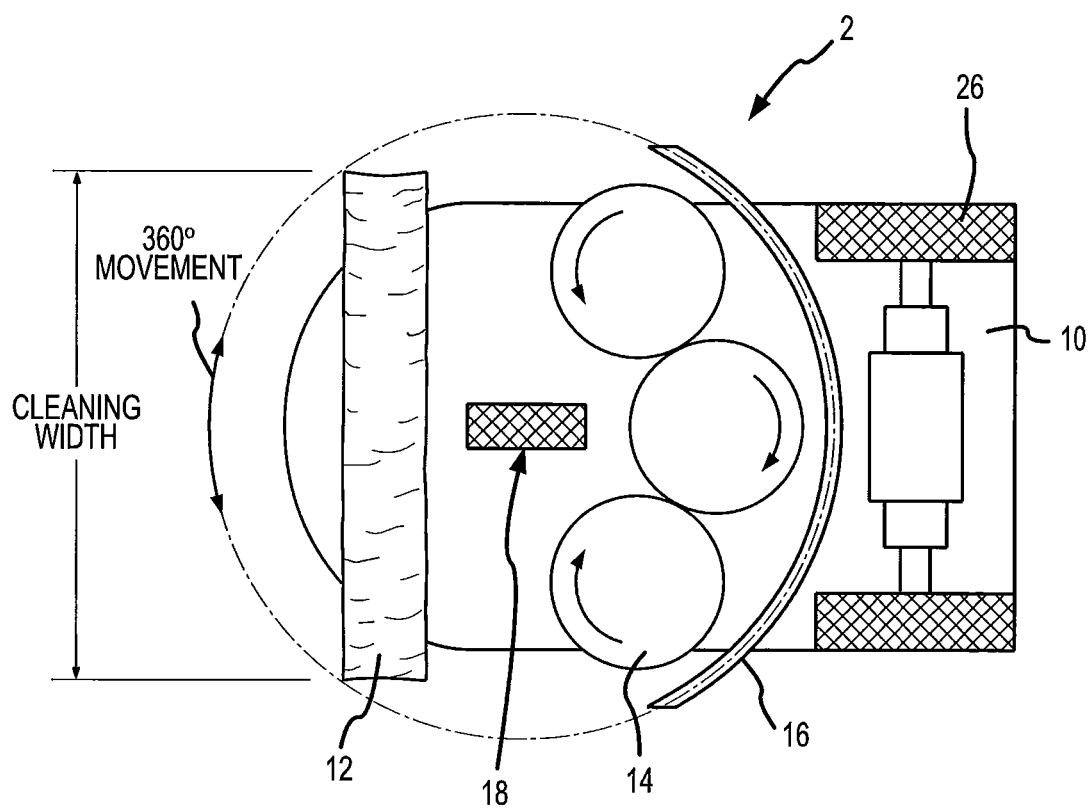
FIG. 10 is a bottom plan view of an alternate embodiment of the present invention showing an alternate configuration of steering, cleaning, and power mechanisms.

Referring now to FIG. 10, an alternate configuration of the cleaning components interconnected to the bottom surface 10 of the chassis 8 is shown. More specifically, this configuration is substantially similar to that shown above in FIG. 9, however, the drive mechanism of the apparatus is a transaxled power plant that provides power to the rear wheels 26, wherein the steering is performed by a front wheel. In one embodiment of the present invention the drive mechanism is an electric monowheel drive. In another embodiment, the drive mechanism comprises rear wheels that are independently driven by drive motors.

Figure 11:
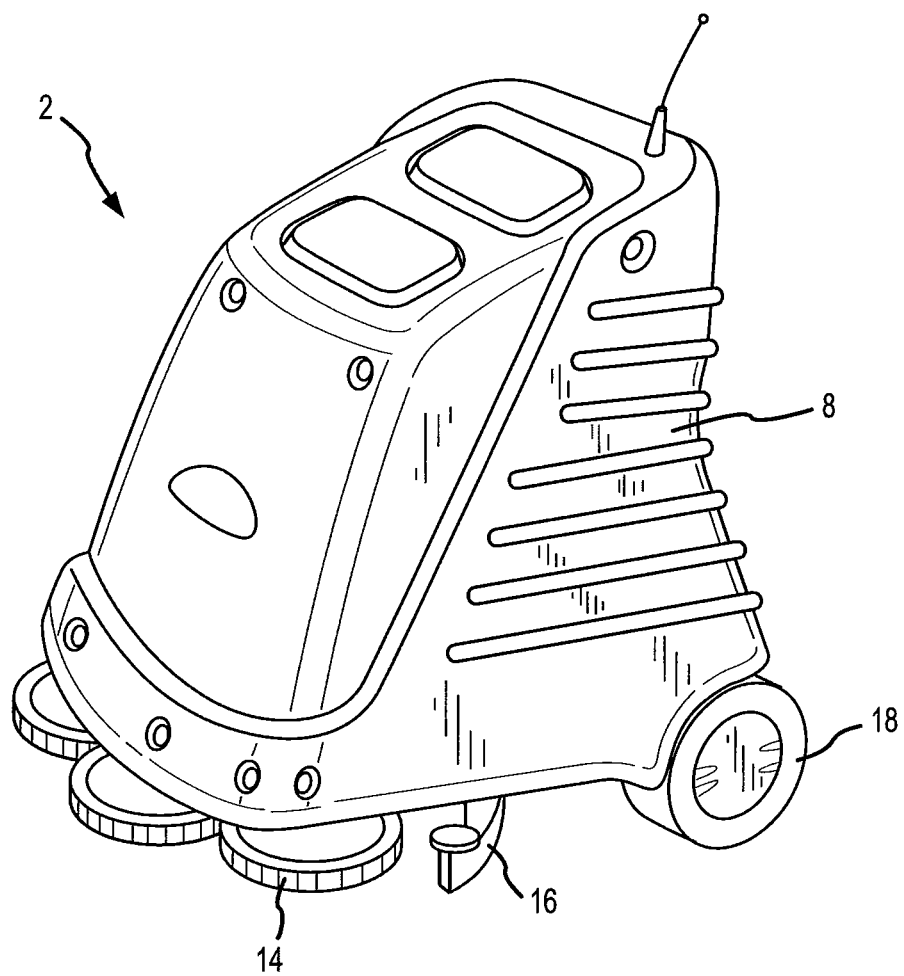
FIG. 11 is a perspective view of an alternative embodiment of the present invention that is adapted to be remotely controlled.

Referring now to FIG. 11, yet another embodiment of the present invention performs a floor treatment operation without the need of physical human contact is shown. More specifically, this embodiment of the present invention is remote controlled or otherwise intelligent such that it cleans a floored surface without the direct contact of an operator. This embodiment of the present invention may be configured for any task, such as scrubbing, sweeping, vacuuming, burnishing, carpet cleaning, waxing, surfacing, cleaning, etc. It is envisioned that the operator be in a separate location, perhaps offsite from the actual cleaning operation, and aided by remote viewing devices. Alternatively, one embodiment of the present invention is programmed with the ability to automatically treat a floor surface, wherein the dimensions of the surface are either programmed into or learned as the apparatus is in use, thereby alleviating any need for human contact with the apparatus. This embodiment of the present invention may be deployed from a storage location automatically wherein quick disconnects to fluid sources or waste receptacles are remotely joined to it such that filling and emptying tanks or waste containers inside the chassis 8 is done without the need of a human operator as well. This embodiment of the present invention may be used in areas where it is dangerous for humans to operate, such as nuclear power plants, areas where asbestos exposure is likely, etc.

Figure 12A:
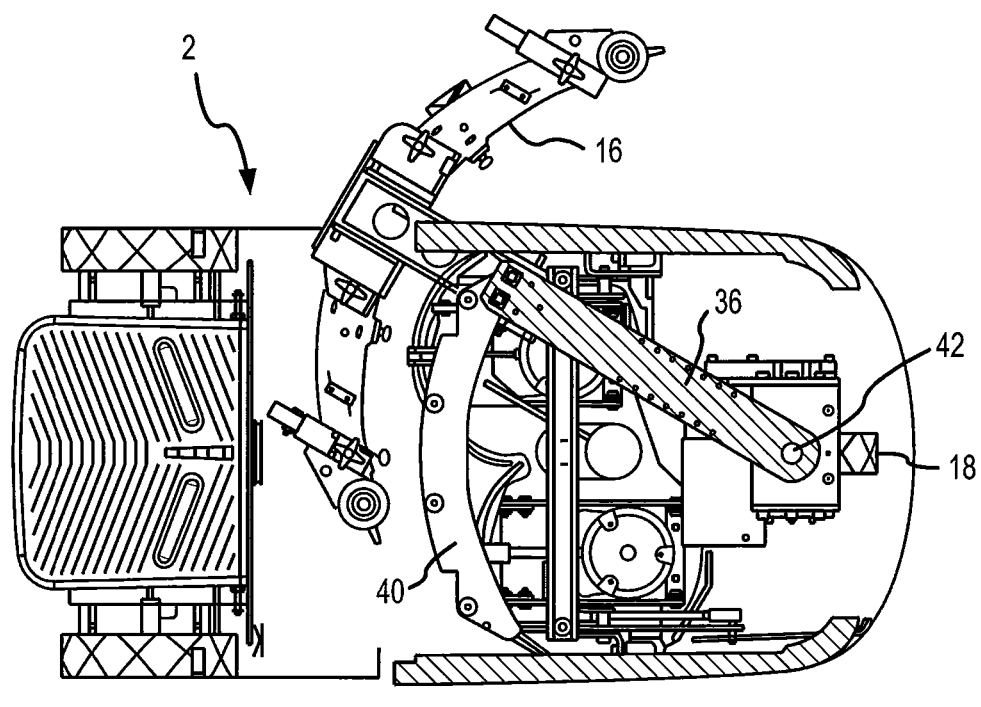
Figure 12B:
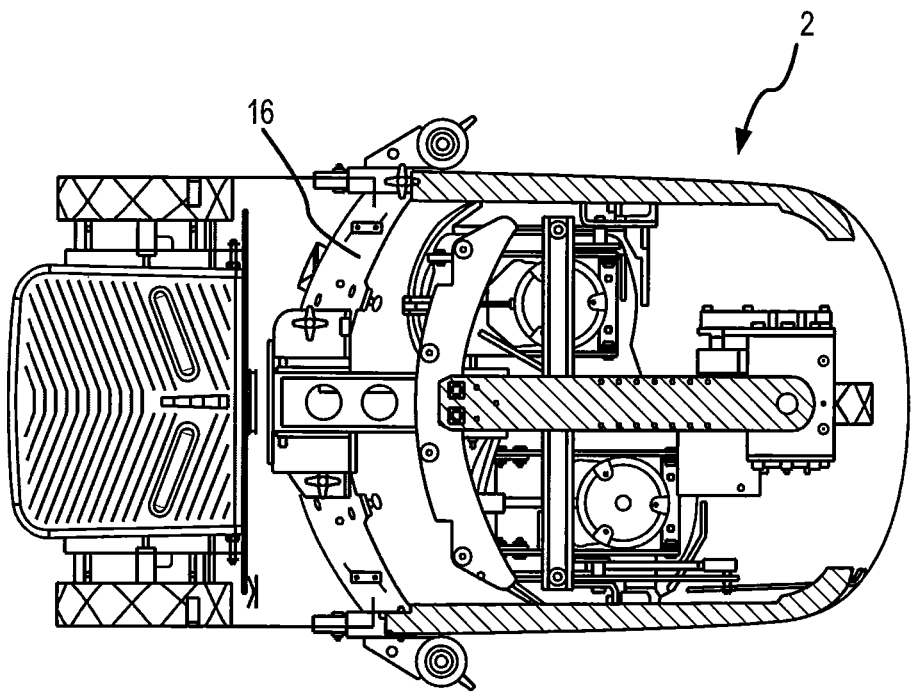
Figure 12C:
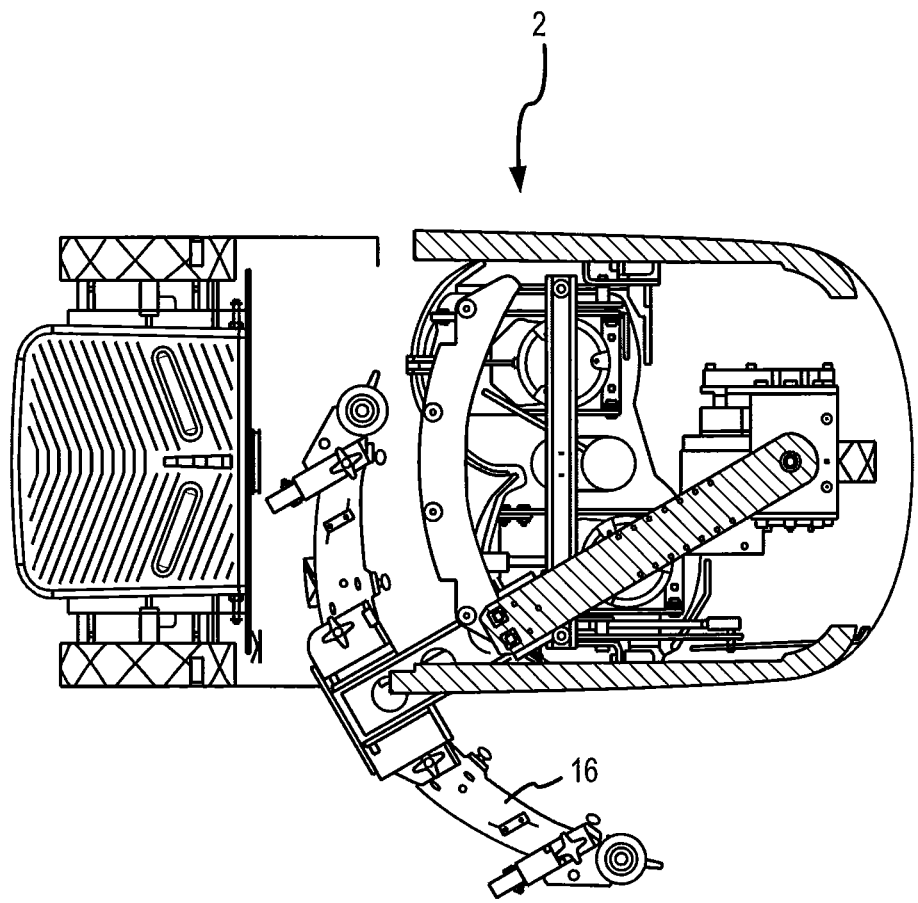

Referring now to FIG. 12A-G, a squeegee 16 for use in one embodiments of the present invention is shown. More specifically, some embodiments of the present invention include a pivot mechanism that allows the squeegee 16 to remain in place when the floor treating apparatus 2 is turning. Thus, the amount of fluid extracted when the apparatus 2 is making a tight turn is increased. In the illustrated embodiment, the squeegee 16 is connected to a swing arm 36 that pivots about a point adjacent to the front wheel 18 of the apparatus. The swing arm 36 is supported via rollers or bearings 38 on a track 40 that maintain the squeegee's 16 vertical position relative to the floor. Upon making a right or left hand turn, friction will tend to keep the squeegee 16 in a straight line, following the original path of the vehicle. Once a new line of travel is established, the squeegee 16 will fall back in place substantially under the apparatus 2. FIG. 12A shows the squeegee 16 in its upmost left position, while FIG. 12C shows the squeegee in its upmost right position. FIG. 12B shows the squeegee in a neutral position while FIG. 12D shows the squeegee in a neutral position but from a side view.

The squeegee 16 of one embodiment of the present invention is provided with a plurality of wheels that interface with the floor to maintain the vertical clearance of the squeegee assembly. In addition, side rollers may be provided that prevent the squeegee 16 from contacting a vertical surface, such as a wall. These wheels and various portions of the squeegee assembly may be selectively adjustable such that the width of the squeegee 16 and the placement of the wheels (squeegee height) may be altered at will.

As shown herein, the swing arm 36 connects to a pivot 42 that utilizes the momentum of the squeegee 16 to swing it from the apparatus 2. However, one skilled in the art will appreciate other methods of transitioning the squeegee 16 from the floor treatment apparatus 2 may be utilized without departing from the scope of the invention. More specifically, a motorized system may be employed that is in communication with the steering system of the vehicle such that rotation of the steering wheel will swing the squeegee 16 away from the apparatus 2 in a predetermined manner.

Figure 12E:
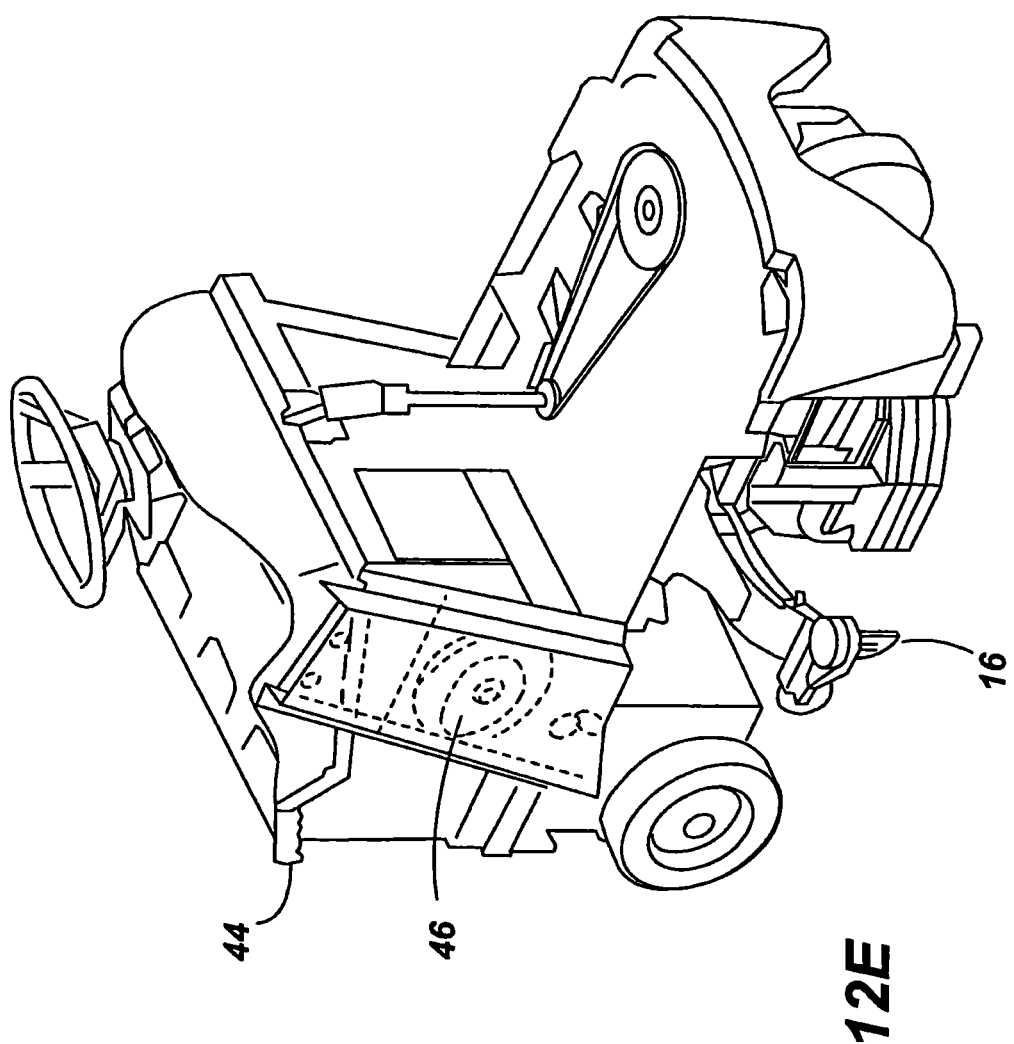
Figure 12G:
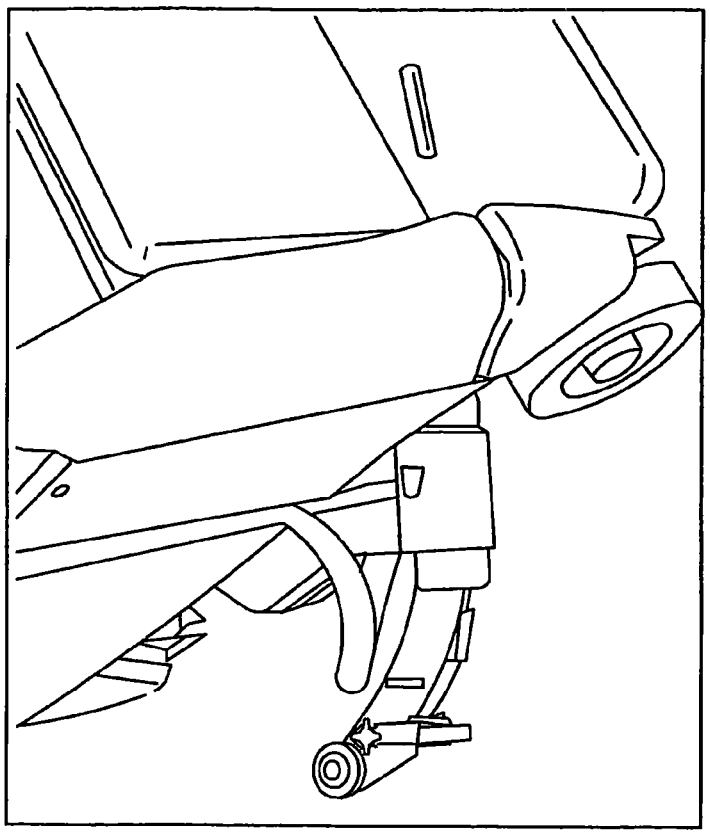
Figure 12F:
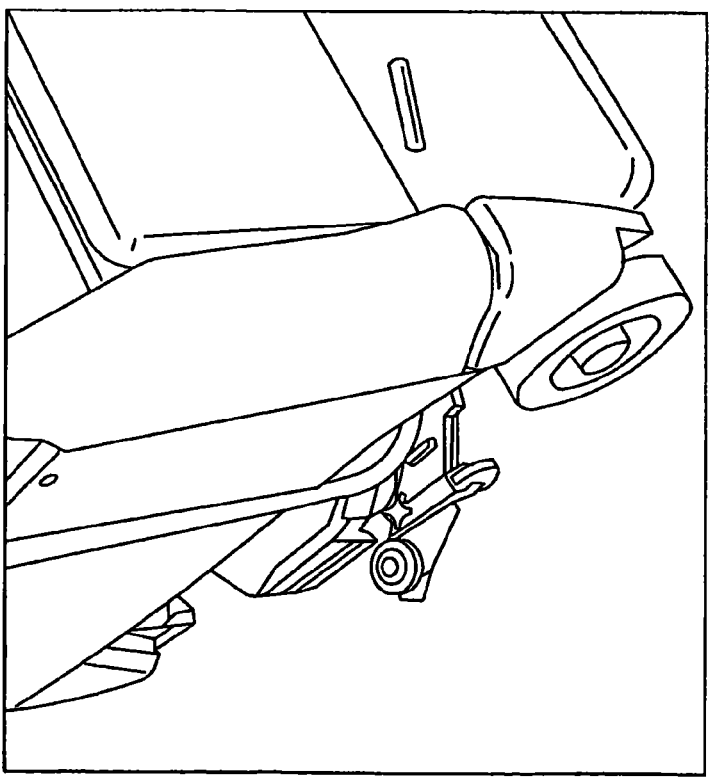

An actuation system that selectively raises the squeegee 16 from the floor may also be included as shown in FIG. 12E. In accordance with some embodiments of the present invention, a handle actuated leverage system 44 is used and is in mechanical communication with a cam 46. The cam allows the user to apply minimal force to the handle 44 adjacent to the control panel to raise and lower the squeegee 16. One skilled in the art will also appreciate that this function may be performed alternatively with a motor.

FIG. 12H is a blow-up of a section of FIG. 12D showing positioning of the track 40 in relation to bearing 38.

Referring now to FIG. 13A-D, a recovery tank strainer basket 48 of one embodiment of the present invention is shown. Recovery tanks of some embodiments of the present invention are constructed out of resiliently deflectable material, such as a plastic bag. The bag is inserted into the clean fluid tank 51 of the apparatus. Once the clean fluid is transferred to the floor treatment tool of the apparatus, waste water may be suctioned into the waste fluid tank, thus expanding the bag and occupying the space once occupied by now dispensed clean fluid. Often, small metal shavings, wood splinters, glass, etc., may be suctioned with the waste fluid and deposited into the waste fluid tank, which may produce rips or tears in the bag and ultimately lead to leakage and contamination of the cleaning fluid. Thus, it is desirable to have a system that captures any dangerous debris such that it does not come in contact with the waste fluid tank. One embodiment of the present invention thus includes a strain basket 48 connected to the cover 49 of the waste fluid tank. In the illustrated embodiment, a generally rectangular straining device constructed of a rigid material with a plurality of apertures therethrough is provided. As the waste water is deposited into the tank through the cover, any large debris is captured by the strain basket 48. One skilled in the art will appreciate that any sized aperture may be employed to dictate the size of debris that is captured. Also, it should be specifically understood that any shape of strain basket 48 may be used without departing from the scope of the invention.

Figure 13A:
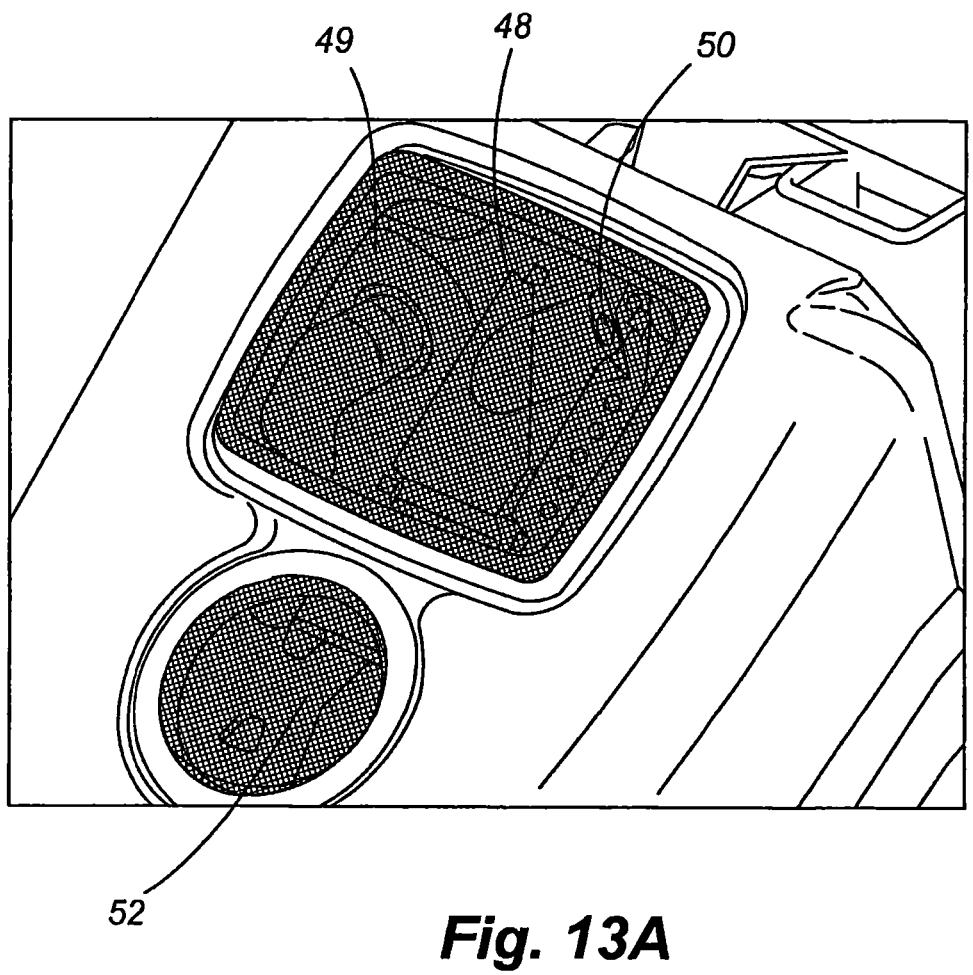
FIGS. 13A-D are views of a waste fluid system showing a strain basket and a drainage port of one embodiment of the present invention.
Figure 13B:
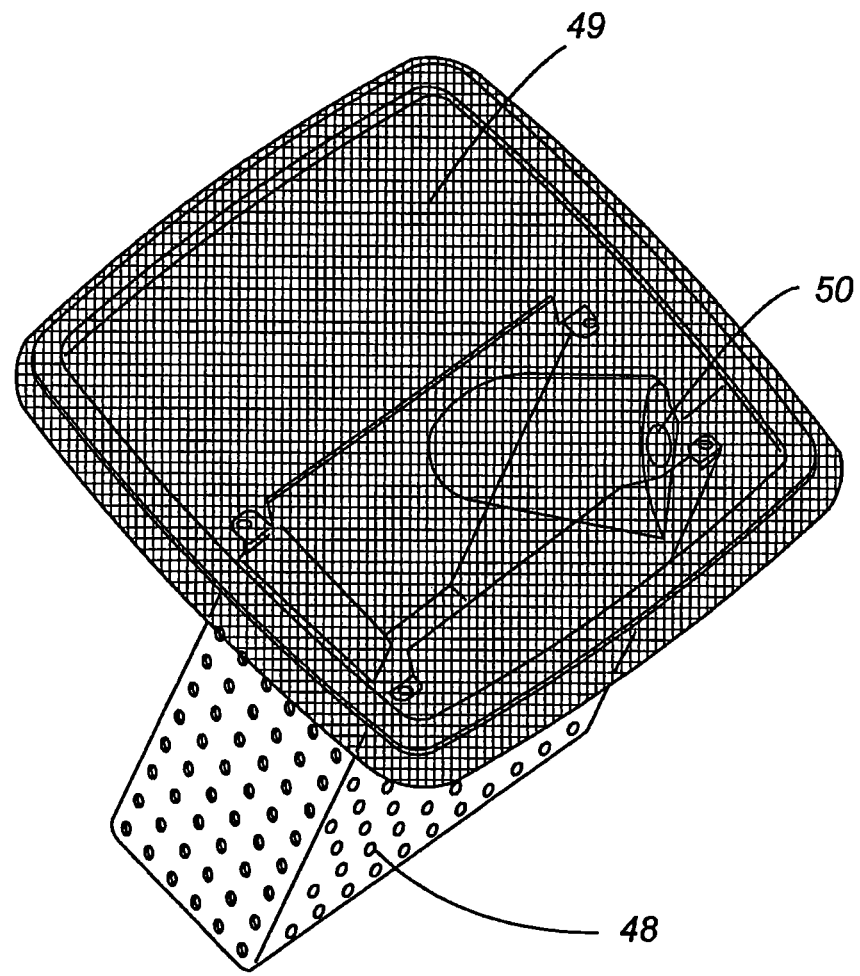
Figure 13C:
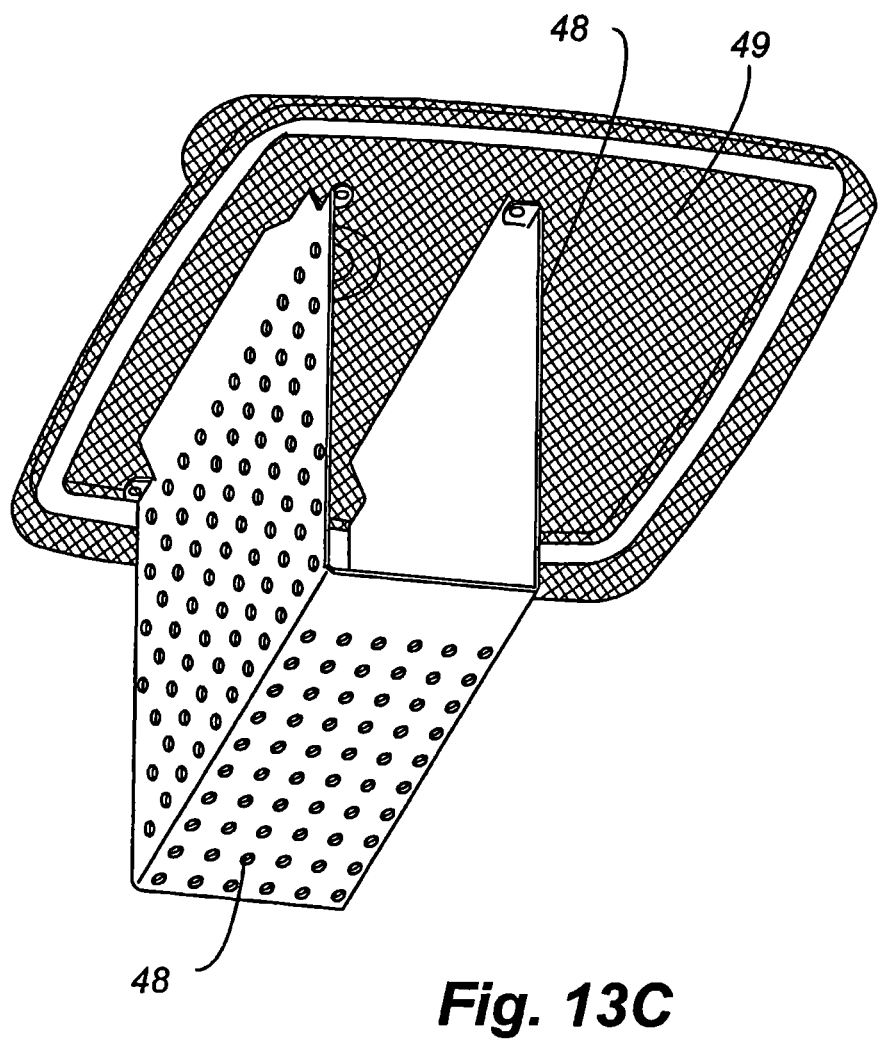
Figure 13D:
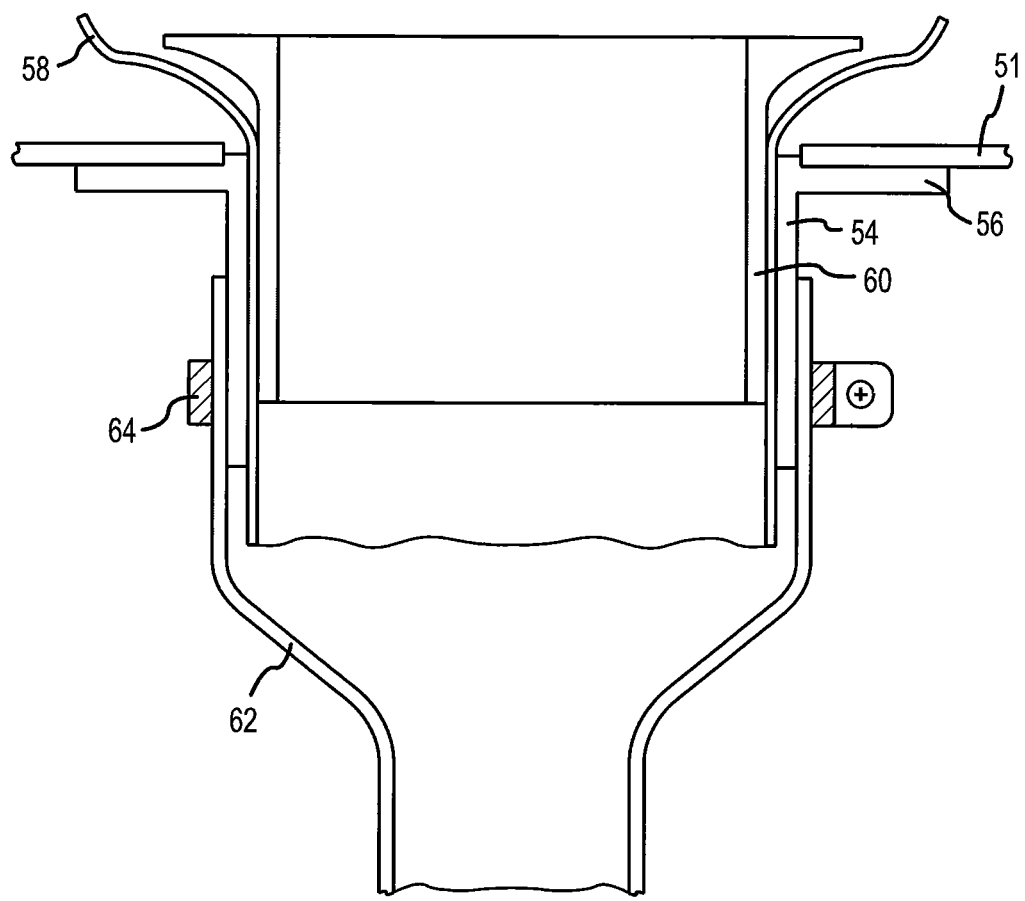
Figure 14A:
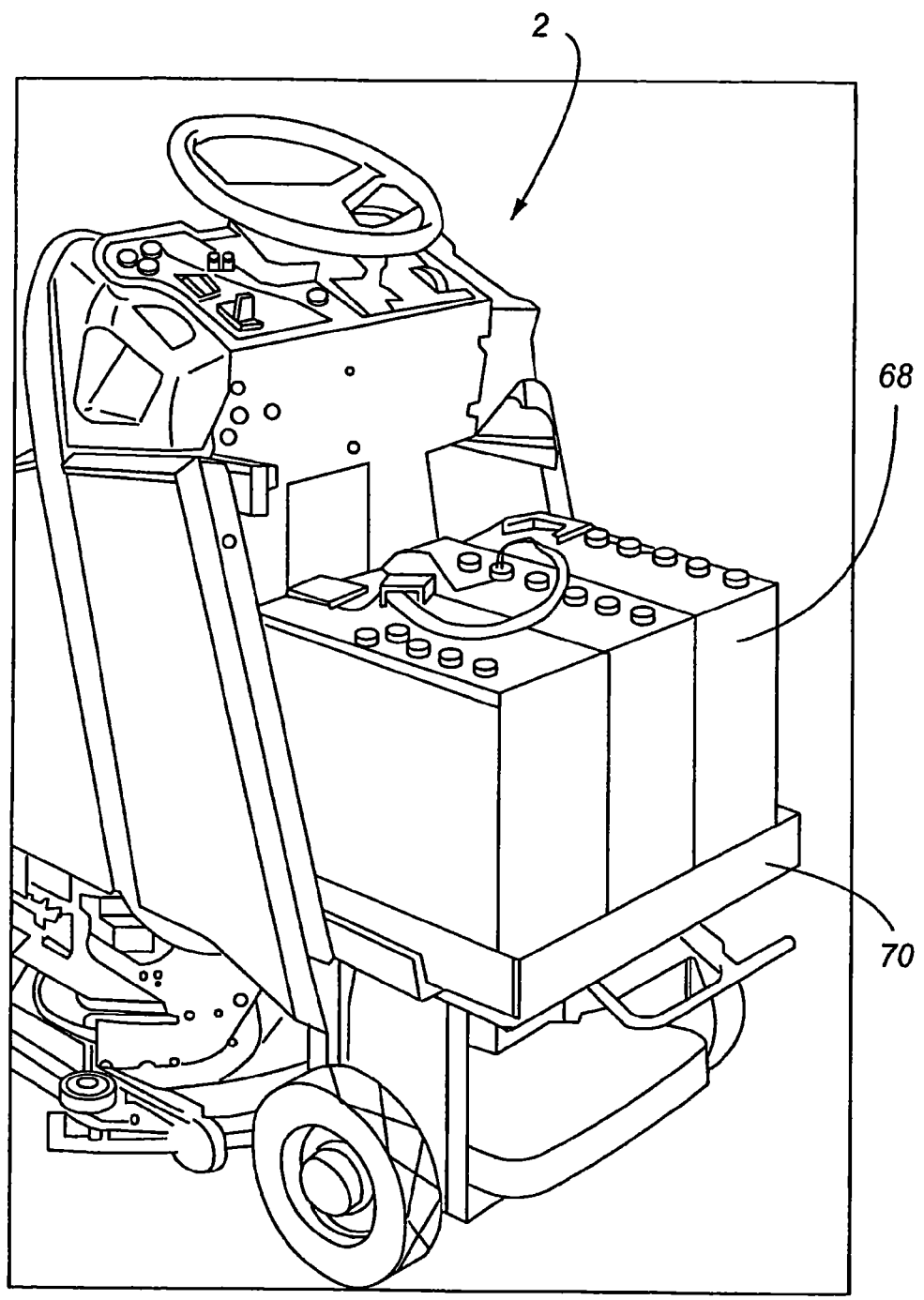
FIGS. 14A-D are views of the rear cowling and battery tray of one embodiment of the present invention.
Figure 14B:
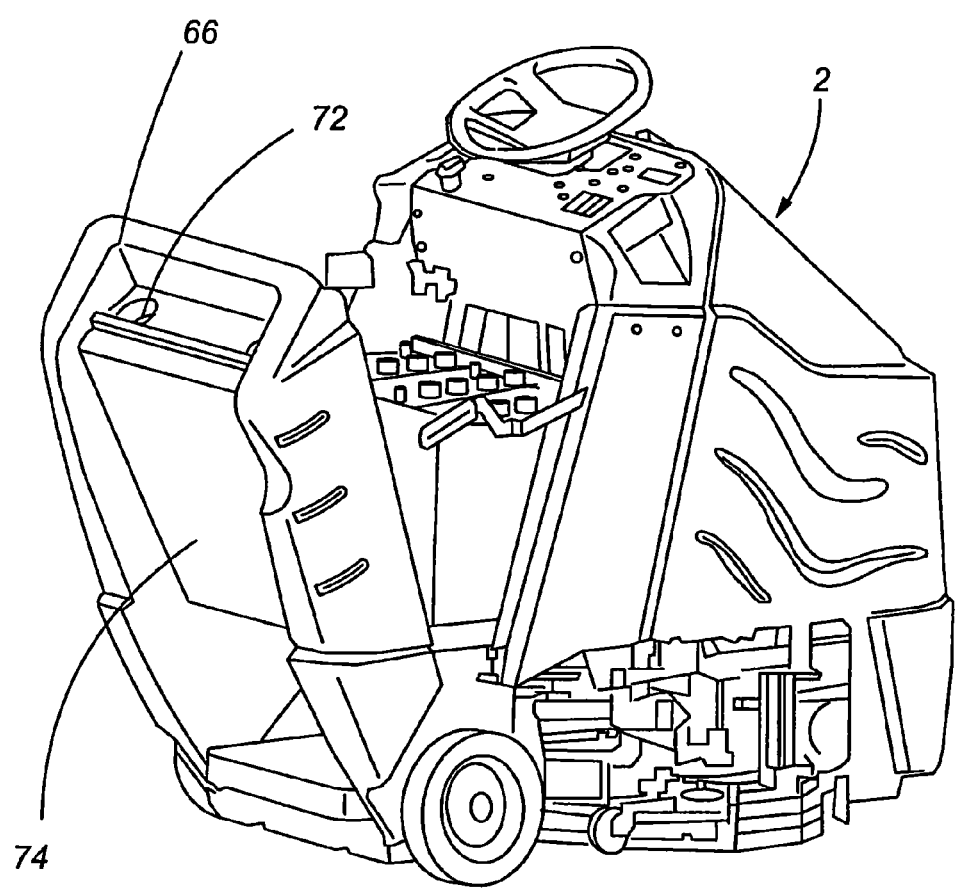
Figure 14C:
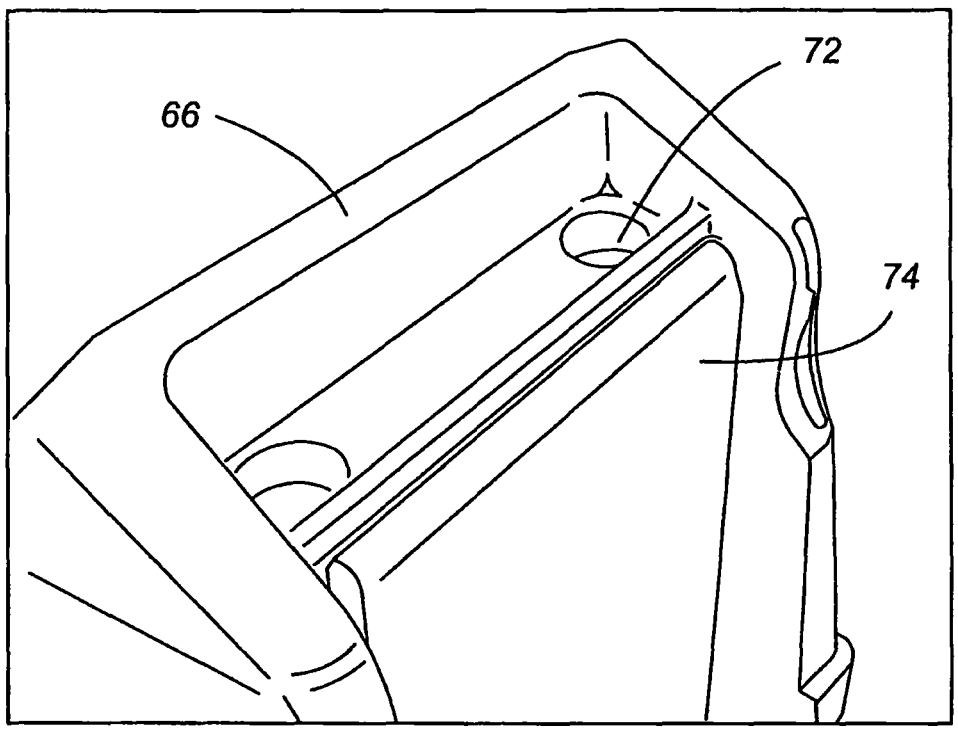
Figure 14D:
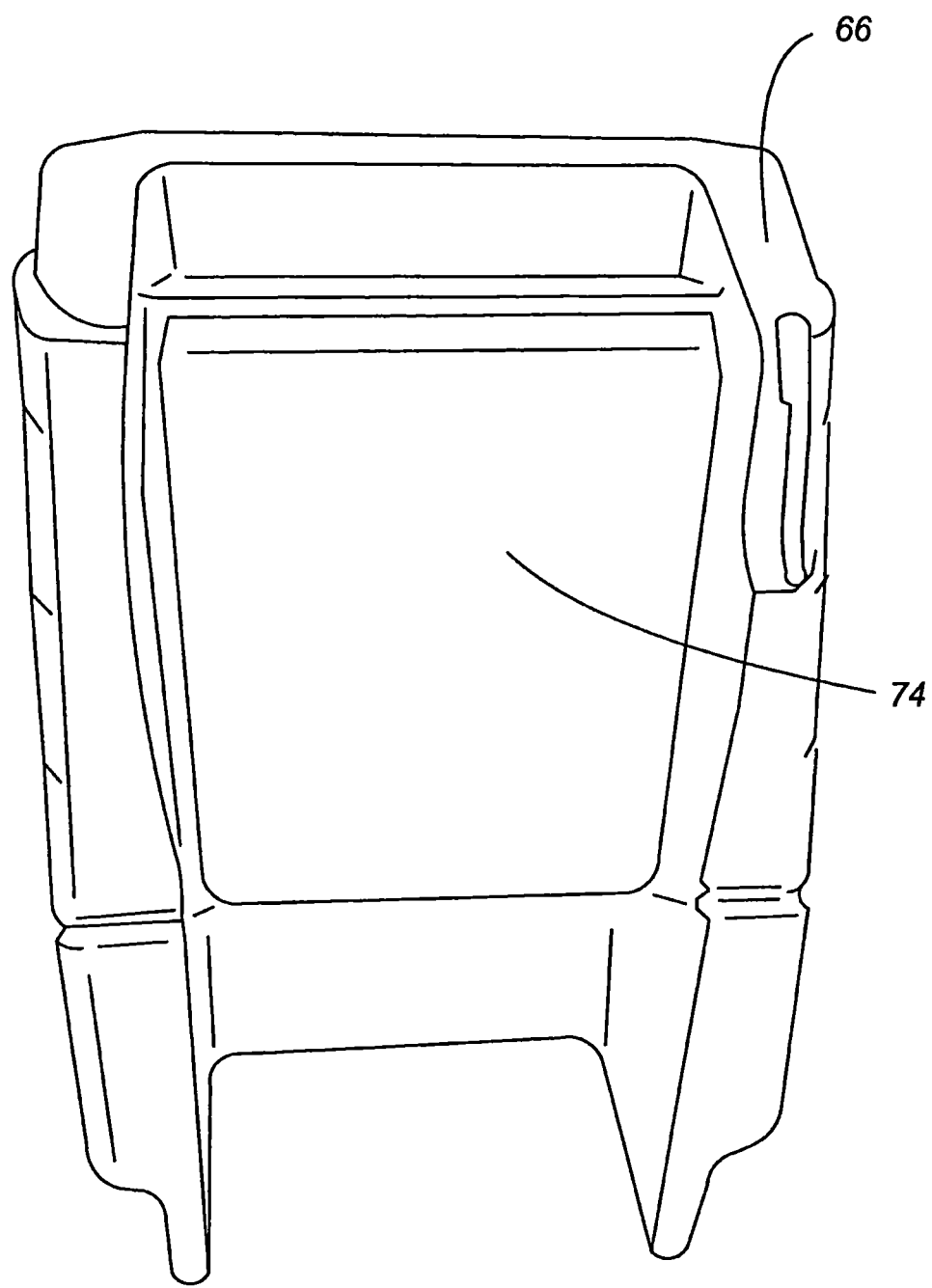

Referring now specifically to FIG. 13D, a fluid discharge system that is connected to the waste water tank 58 of one embodiment of the present invention is shown. More specifically, a fitting 54 with a flange 56 may be used that is connected to the main storage tank 51 of the apparatus. Preferably, the fitting 54 is spun at a high rate of speed and engaged with an aperture in the tank 51, thus creating friction induced heat between the two surfaces and welding them together. The opening of the waste water bag 58 is then fed through the fitting 54 and a mandrill 60 is added to sandwich the waste water bag 58 therebetween. The mandrill 60 is made out of a rigid material, such as aluminum to ensure an open flow path. A drain hose 62 is slid over the outer surface of the fitting 54 and is secured with a clamp 64. One skilled in the art will appreciate that the drain hose 64 is generally capped during use, wherein the user disconnects the cap to drain the waste water from the bag 58. To ensure that the bag 58 is entirely empty, a new solution may be added to the tank, thus squeezing the bag 58 to expel all the waste water contained therein.

Referring now to FIG. 14A-D, the rear portion of the floor treatment apparatus 2 is shown. More specifically, the rear of the apparatus 2 includes a removable cowling 66. The cowling 66 of the present invention is capable of selective rotation about an axis parallel to the rear axle of the apparatus 2. Alternatively, the rear cowling 66 may be completely removable. This aspect of the present invention provides the ability to access batteries 68 that may provide power to the apparatus 2. The batteries 68 may reside on a removable tray 70 that is slidingly engaged to the apparatus 2, thus providing easy access for maintenance. The tray 70 resides on tracks that interface with a plurality of wheels, bearings, etc. The tray also includes a locking feature that securely maintains the batteries 68 inside the vehicle. The rear cowling 66 also includes other features, such as a cavity for securing various items and drink holders 72. A pad 74 may also be included that provides greater protection and comfort to the user.

Figure 15:
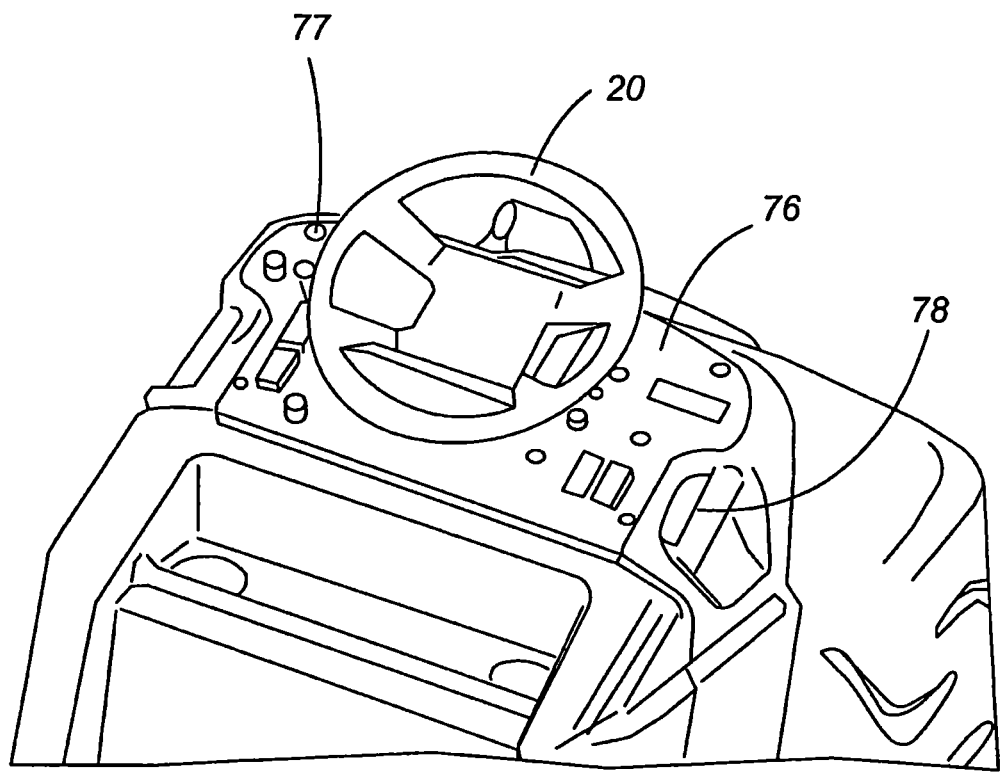
FIG. 15 is a perspective view of a control panel and handles of one embodiment of the present invention.

Referring now to FIG. 15, a control panel 76 and associated structure of one embodiment of the present invention is shown. Embodiments of the present invention include a control panel 76 that includes minimal fasteners 77 for interconnection to the floor treatment apparatus 2. That is, thumb screws, or similar type of fasteners may be included such that quick and easy removal of the control panel 76 may be achieved to facilitate repair.

Embodiments of the present invention also include hand grips 24 adjacent to the control panel 76 to provide support for the operator. More specifically, during tight turns the inertial forces acting upon an individual may cause an operator to fall. Hand grips 24, which may be integrated onto the chassis of the apparatus, will give the operator a place to hold onto the device for added comfort and provide an additional safety feature. In addition they provide support when operating control switches located adjacent to handle grip.

Figure 16:
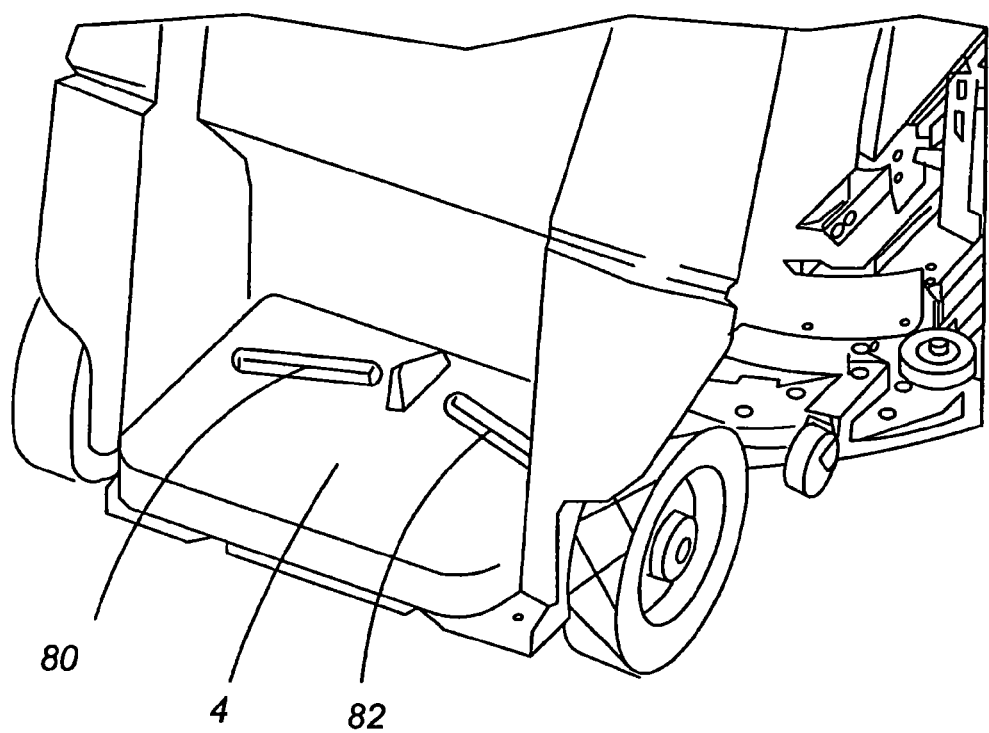
FIG. 16 is a perspective view of an operator platform with a plurality of switches of one embodiment of the present invention.

Referring now to FIG. 16, the platform 4 of one embodiment of the present invention is shown. More specifically, one embodiment of the present invention includes a platform 4 with an operator presence switch 80, a platform switch and a throttle 82. The platform 4 also may include a suspension system and be cushioned to increase operator comfort. In addition, the platform 4 may be foldable such that the envelop of the apparatus may be selectively reduced. In some embodiments of the present invention the platform 4 is located above an axis defined by the centers of the wheels located near the rear of the floor cleaning machine, as specifically shown at least in FIGS. 12A-12D, 16 and 19A.

The operator presence switch 80 of one embodiment of the present invention is designed to act as a safety feature that interrupts the throttle pedal when not depressed. This ensures that the operator has both feet positioned on the platform when the machine is in use. Upon deactivation of the switch, for example if the operator removes a foot from the switch, a neutral mode may be engaged such that no power or forward or rearward motion of the device is possible. In addition, the operator presence switch 80 may ensure that sufficient weight is maintained on the platform at all times as a safety feature.

In the typical use, the platform switch is in operable connection with the platform, such that it is activated when the operator stands on the platform. The operator must then engage a reset device, preferably on the control panel, to initiate motion. The purpose of the platform switch and reset switch is to act as a safety feature such that the machine does not immediately move when the operator steps on to the peddle platform. Upon deactivation of the switch, for example if the operator steps from the apparatus, a neutral mode may be engaged such that no power and forward or rearward motion is possible.

The throttle 82 of some embodiments of the present invention is adapted to selectively increase or decrease the speed of the apparatus depending on the desires of the operator. More specifically, various speed ranges may be included: neutral, first, second, third, reverse, etc. (or slow, medium, fast, etc.). In some embodiments, cleaning operations are performed at slow speeds, while transportation from location to location is performed at higher speeds. When the operator sets the speed range to first, for example, the activation of the throttle 82 will propel the apparatus within that speed range, such that it can not transition from the first range to the second range without a manual shift of the range. Thus, embodiments of the present invention include a hand speed range selector, wherein the throttle 82 simply turns the desired speed range to an activated mode. The neutral mode may also be set by the operator, wherein no amount of throttle 82 engagement will increase the speed of the apparatus. In addition, as mentioned briefly above, when the operator removes his or her foot from the operator presence switch 80, the apparatus automatically disengages the throttle. One skilled in the art will appreciate however, that a throttle 82 may be provided that provides selective speed increments, such as employed on an automobile, without departing from the scope of the invention.

Embodiments of the present invention also include a braking mechanism. For example, when an operator removes his or her foot from the operator presence switch 80, throttle, or disengages the platform switch, a braking mechanism may be employed such that any motion of the apparatus automatically or gradually ceases. The braking mechanism may be electro mechanical, mechanical or hydraulic. Alternatively, the foot brake may be provided adjacent to the throttle 82 or operator presence switch 80 that provides the same halting capability. Further, hand or emergency brakes may be employed adjacent to the control panel of the apparatus.

Figure 17B:
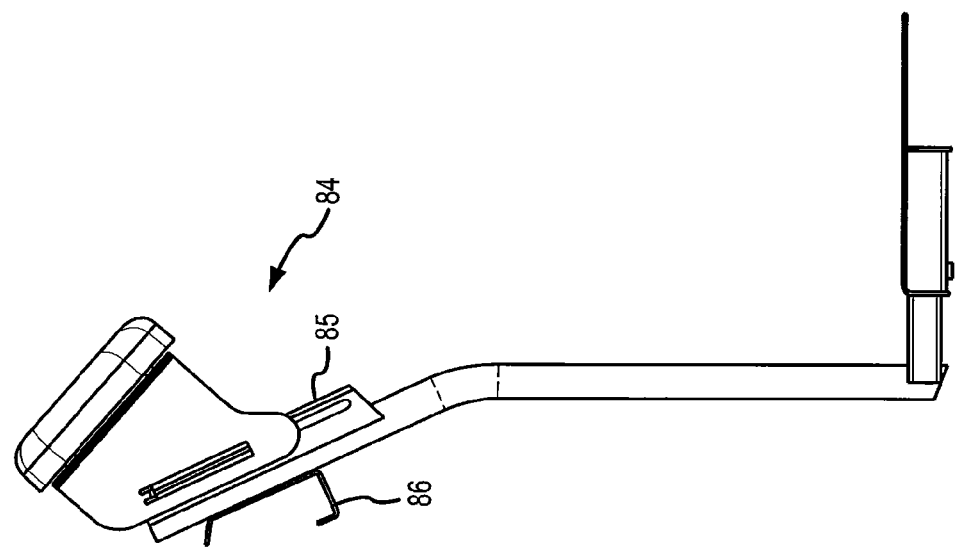
FIGS. 17A-B is are views of a seat of one embodiment of the present invention.
Figure 17A:
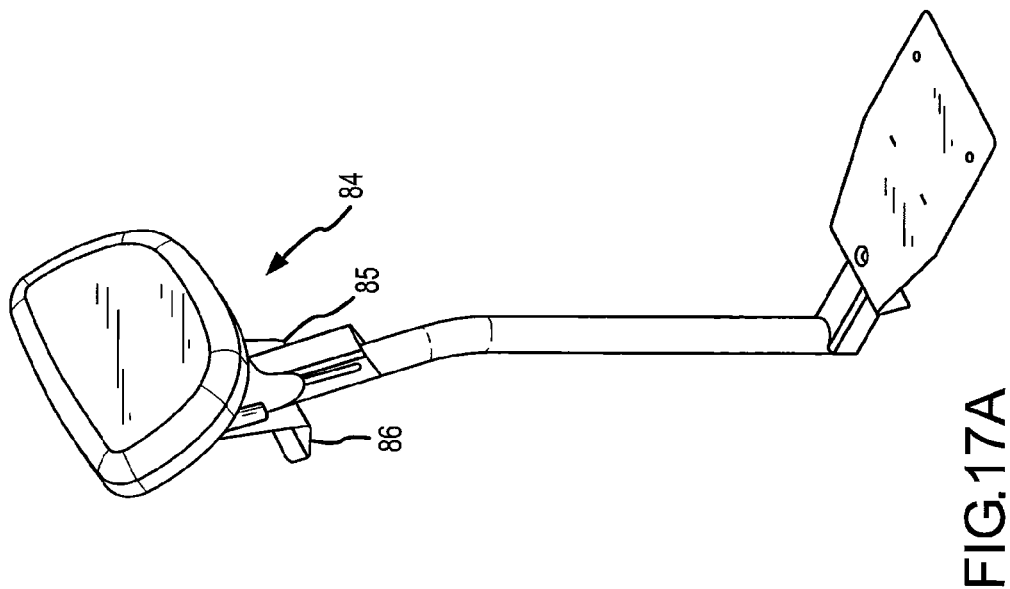
Figure 18A:
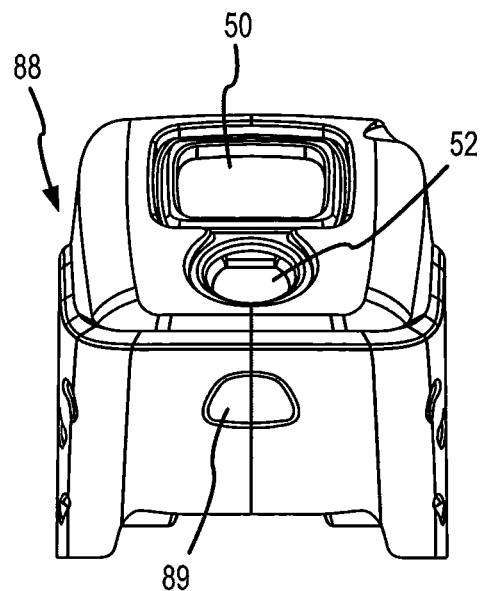
FIGS. 18A-D are views of a tank and front cowling of one embodiment of the present invention.
Figure 18B:
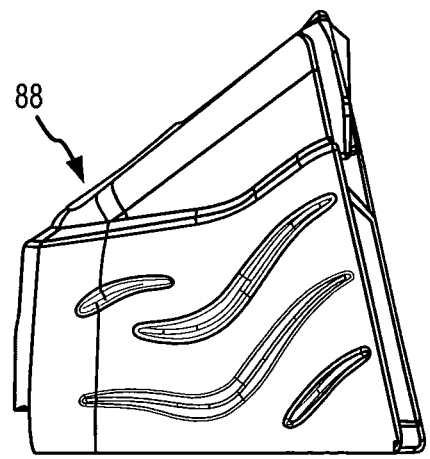
Figure 18C:
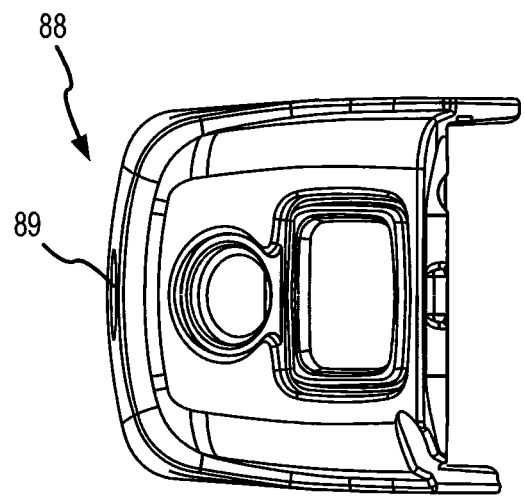
Figure 18D:
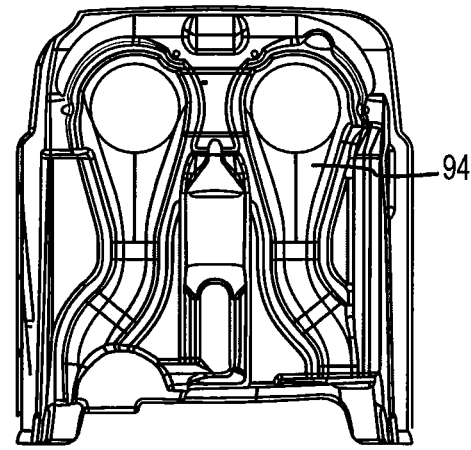

Referring now to FIG. 17A-B, a seat 84 of one embodiment of the present invention is shown. More specifically, embodiments of the present invention include a selectively connectable seating device 84 for engagement with the chassis to increase the operator comfort. Seats 84 of some embodiments of the present invention are selectively adjustable 85, thus making them easy to accommodate any sized individual. In operation, a receiver hitch, or similar connection mechanism, is connected to the rear portion of the platform 4 and a mating device for interconnection to the receiver hitch, or other device, is provided on the seat 84. The seat 84 may also include a plurality of hooks, shelves, cup holders, etc. for the securement of cords, bags, or any other type of cleaning or comfort related item. Further, the receiver hitch may be used when the seat 84 is engaged or not engaged, for example, to transport other items such as a supplemental wheeled device that may accommodate extra power sources, cleaning supplies, tanks, etc.

Referring now to FIG. 18A-D, a tank 50 of one embodiment of the present invention is shown. Some embodiments of the present invention include a tank 50 that is equipped with a plurality of lights 89 and/or horns that facilitate cleaning and/or act as additional safety features. Alternatively, lights may be integrated into bumpers positioned adjacent to the tank 50 or on the sides of the apparatus.

Although not shown, a filter may be provided in fluid communication with the fluid pump. This filter is designed to capture any debris that may adversely affect the operation of the pump. Unfortunately on many cleaning machines, the filter is placed in a hard to access location, such that repair or monitoring thereof is very difficult. Thus, one embodiment of the present invention includes a filter that is situated on the outer surface of the cowling, perhaps on the control panel. Thus, the operator has ample opportunity to monitor the integrity of the filter and make quick repairs when necessary.

Figures 19A, 19B:
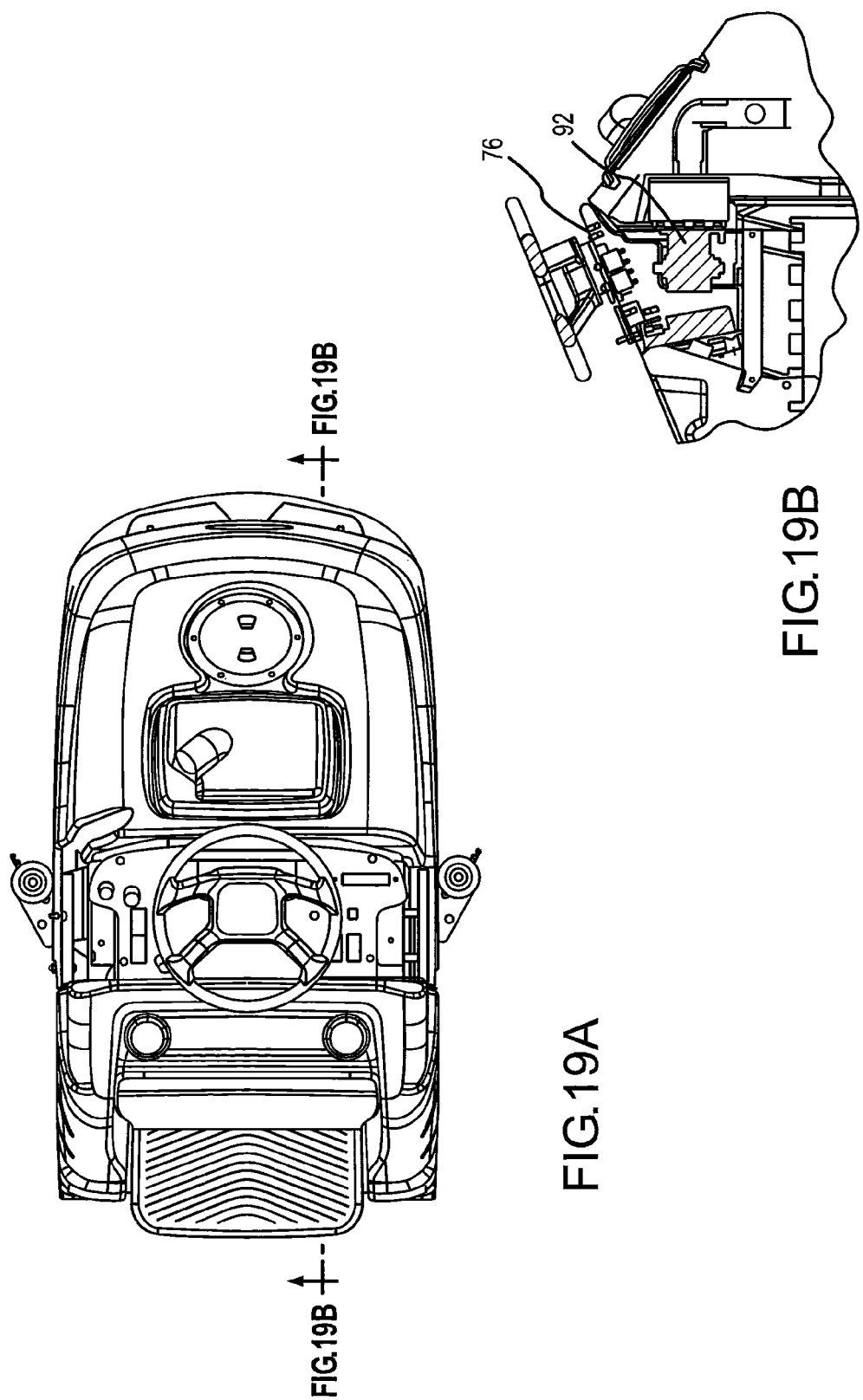
FIGS. 19A-B are views of a vacuum fan interconnected to the front cowling of one embodiment of the present invention.

Referring now to FIG. 19A-B, a vacuum fan 92 which is connected to the front cowling 88 of one embodiment of the present invention is shown. More specifically, a vacuum fan 92 provides suction to remove debris filled fluids from the floor. The fan 92 is preferably situated under the control panel 76 of the vehicle, such that the intake cooling air that is drawn in by the vacuum fan 92 is channeled adjacent to the control panel 76 to cool componentry associated therewith.

In addition, the tank 50 may be made out of a formable material such that exhaust channels 94 may be machined or molded into the tank 50. The channels 94 direct the exhaust air from the vacuum 92 to an exit muffler of the apparatus. The channels 94 also act as a baffle to remove noise energy from the exhaust gases, thus making the entire system more quiet.

Figure 20:
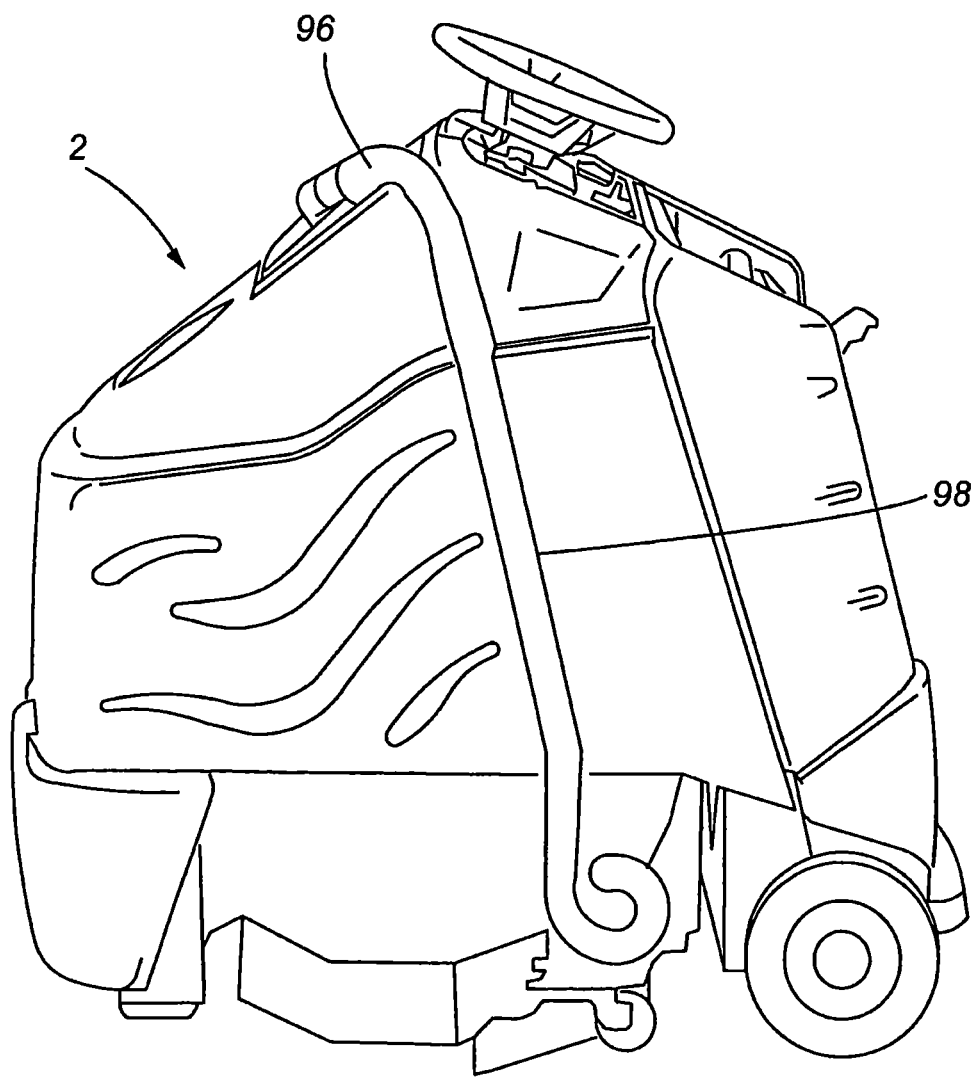
FIG. 20 is a right elevation view of one embodiment of the present invention showing the waste water return hose.

Referring now to FIG. 20, a waste fluid return hose 96 is shown. More specifically, one embodiment of the present invention decreases its profile by inserting the waste water hose 96 into a hose channel 98 that is integrated into the outside surface of the apparatus 2. The hose 96 being situated on the outside also has the added advantage of making it very accessible, such that it can be removed and inspected for clogs or breaches.

Further, some embodiments of the present invention are provided with tip over stops adjacent to the front corners of the apparatus. The stops may be replaceable and ensure that the apparatus does not tip over during tight turns. The tip over stops are generally constructed out of a material that is harmless to flooring, such as Teflon, silicone, rubber, plastic, etc. In addition, one skilled in the art will appreciate that rollers may be employed that are situated a predetermined distance from the floor to perform the same function.

Referring now to FIGS. 1-20, a manner of making the present invention is shown and described herein. As has been explained, the present invention is generally similar to the floor treatment devices used in the art. However, unlike many prior art devices, the present invention provides a location for which the operator can stand or sit, thus enabling him or her to more efficiently perform their tasks. In addition, instead of using brute strength to perform the task of steering the cleaning device, a steering mechanism and associated hardware are provided to aid in the smooth transition from one direction to another. Also, the present invention device has a compact profile and mechanism which allows for 360° cleaning of tight spaces. Further, to construct the remote control version of the system, software that is known in the art may be installed in the chassis 8 to allow for the system to be either remotely controlled or learn the cleaning surface as it operates. In addition, a series of cameras may be interconnected to the chassis 8 to provide remote viewing to an operator offsite.

While various embodiment of the present invention have been described in detail, it is apparent that modifications and alterations of those embodiments will occur to those skilled in the art. However, it is to be expressly understood that such modifications and alterations are within the scope and spirit of the present invention, as set forth in the following claims.

What is claimed is:

1. A floor treatment apparatus, comprising:
    a chassis having a front and a back and a lower surface, a front surface adjacent the front, a rear surface adjacent the back, a left side and right side and a platform;
    at least a first wheel, a second wheel and a third wheel which at least partially support the weight of the chassis;
    a floor treatment mechanism interconnected to the lower surface;
    a power source interconnected to at least one of the wheels;
    a mechanism operably interconnected to at least one of the wheels to allow an operator to steer the apparatus and wherein the chassis is allowed to rotate 360 degrees without substantially moving in other directions;
    wherein the platform is located substantially below the steering mechanism and substantially directly above an axis extending between the center of the first and second wheels, which are located substantially toward the back of the apparatus; and
    wherein the platform includes a throttle, an operator present switch that interrupts the throttle when not depressed, and a platform switch which must be engaged in order for the throttle to be effective.

2. The floor treatment apparatus of claim 1, wherein the floor treatment mechanism is at least one of a brush, a burnisher, a squeegee, a vacuum and a debris collection device.

3. The floor treatment apparatus of claim 1, wherein the chassis has a maximum outside envelope of about 50 inches high, 26 inches wide and 51 inches long.

4. The floor treatment apparatus of claim 1, further including a debris collection device connected adjacent to the lower surface of the chassis.

5. The floor treatment apparatus of claim 1, further including a fluid storage compartment, a chemical storage compartment and a control mechanism which will selectively mix fluid from the fluid storage compartment with fluid from the chemical storage compartment to form a cleaning fluid.

6. The floor treatment apparatus of claim 1, further comprising:
    an electric monowheel drive motor interconnected to the power source and at least one of the first wheel, the second wheel, and the third wheel.

7. The floor treatment apparatus of claim 6, wherein the maximum vertical distance between the platform and the floor is 200 millimeters.

8. The floor treatment apparatus of claim 6, wherein at least one of the first wheel and second wheel are independently driven by the drive motor.

9. The floor treatment apparatus of claim 6, wherein the third wheel is a steered wheel driven by the drive motor.

10. The floor treatment apparatus of claim 6, wherein the first wheel and second wheel are independently suspended.

* * * * *